United States Patent
Shipkov et al.

(10) Patent No.: US 10,229,535 B2
(45) Date of Patent: Mar. 12, 2019

(54) SYSTEMS AND METHODS FOR AUTOMATED VIRTUAL GEOMETRY DEFORMATION

(71) Applicant: DELUXE MEDIA CREATIVE SERVICES INC., Burbank, CA (US)

(72) Inventors: Peter Shipkov, Marina Del Rey, CA (US); Simon Yuen, Playa Vista, CA (US); Malte Wagener, Los Angeles, CA (US)

(73) Assignee: DELUXE MEDIA CREATIVE SERVICES INC., Burbank, CA (US)

( * ) Notice: Subject to any disclaimer, the term of this patent is extended or adjusted under 35 U.S.C. 154(b) by 0 days.

(21) Appl. No.: 15/065,114

(22) Filed: Mar. 9, 2016

(65) Prior Publication Data

US 2017/0263051 A1  Sep. 14, 2017

(51) Int. Cl.

| | |
|---|---|
| *G06T 17/20* | (2006.01) |
| *G06T 13/20* | (2011.01) |
| *G06T 13/40* | (2011.01) |
| *G06T 19/20* | (2011.01) |

(52) U.S. Cl.
CPC ............ *G06T 17/20* (2013.01); *G06T 13/20* (2013.01); *G06T 13/40* (2013.01); *G06T 17/205* (2013.01); *G06T 19/20* (2013.01); *G06T 2219/2021* (2013.01)

(58) Field of Classification Search
None
See application file for complete search history.

(56) References Cited

U.S. PATENT DOCUMENTS

| | | | |
|---|---|---|---|
| 6,476,804 B1* | 11/2002 | Costabel ................. | G06T 13/20 345/419 |
| 2007/0019882 A1* | 1/2007 | Tanaka .................... | G06T 17/20 382/276 |
| 2008/0043021 A1 | 2/2008 | Huang et al. | |
| 2009/0306948 A1* | 12/2009 | Irving ..................... | G06T 13/20 703/6 |
| 2017/0032560 A1* | 2/2017 | Dionne ................... | G06T 13/40 |

OTHER PUBLICATIONS

Extended European Search Report dated Jul. 26, 2017, in European Application No. 17 16 0044, 11 pages.

(Continued)

*Primary Examiner* — Yi Wang
(74) *Attorney, Agent, or Firm* — Dorsey & Whitney LLP

(57) ABSTRACT

Various embodiments of systems and methods for deforming a virtual geometric object are disclosed. In accordance with at least one embodiment, a method for deforming a virtual geometric object substantially real-time includes the operations of relaxing a hi-res mesh defining a shape of the object, wherein the hi-res mesh corresponds to a proxy mesh, relaxing the hi-res mesh at least once, recording the location of the elements of the hi-res mesh as relaxed, deforming the proxy mesh, adjusting the location of one or more elements on the hi-res mesh relative to the as deformed proxy mesh, relaxing the adjusted elements on the deformed hi-res mesh, and adjusting the location of the hi-res mesh as deformed in view of the previously recorded elements of the hi-res mesh as relaxed both pre and after deformation.

46 Claims, 8 Drawing Sheets

(56) References Cited

OTHER PUBLICATIONS

Feng et al., "Multiresolution free-form deformation with subdivision surface of arbitrary topology," *The Visual Computer; International Journal of Computer Graphics*, (2006), 22:28-42.

Ju et al., "Reusable Skinning Templates Using Cage-based Deformations," *ACM Transactions on Graphics (TOG)*, ACM, (2008), 27(5):1-10.

Kobayashi et al., "t-FFD: Free-Form Deformation by using Triangular Mesh," Proceedings 8th ACM Symposium on Solid Modeling and Applications, SM '03, Jun. 16-20, 2003, Seattle, WA, U.S.A., pp. 226-234.

Rumman et al., "State of the Art in Skinning Techniques for Articulated Deformable Characters," Proceedings of the 11th Joint Conference on Computer Vision, Imaging and Computer Graphics Theory and Applications, Jan. 1, 2016, pp. 198-210.

\* cited by examiner

SYSTEMS AND METHODS FOR AUTOMATED VIRTUAL GEOMETRY DEFORMATION

TECHNICAL FIELD

The technology described herein relates to systems and methods for deforming virtual geometrical objects, characters and/or items.

BACKGROUND

Today, animators of three-dimensional ("3D") computer generated objects, characters and/or items (collectively, "Objects") often use one or more mesh structures to provide a framework for the Object. To animate such Objects, animators typically create a sequence of frames (for example, 20 to 30 frames per second), where each frame is a snap-shot of one or more Objects in time and where one or more elements of any such Object(s) are deformed from one frame to a next. Further, the underlying shape and/or structure of a given Object is often represented on an animator's computer display separate from its final outward appearance by a mesh of polygonal shapes, such as triangles, pentagons and the like. Such polygonal objects identify the shape of the object upon which textures and other processes are later applied.

To animate such an Object, an animator will typically use labor intensive and manual processes whereby the placement and other characteristics of one or more of the before-mentioned polygonal shapes are deformed from one frame to the next. Often groups of polygonal shapes are deformed in bulk, with later touch-up of individual polygons occurring manually. While various approaches have been proposed, which seek to create greater efficiencies in such animation processes and the deformation of mesh structures, currently available approaches still either require extensive manual manipulation of often each of the polygonal shapes at issue by an animator to provide a desired finished quality or otherwise suffer from human perceptible deficiencies in animation quality, such as blocky movement, noticeable artifacts and others. Such deficiencies often result in non-life-like deformations of computer generated Objects, as perceived by a human viewer. Accordingly, a need exists for devices, methods and systems which automate the process of deforming computer generated Objects, while facilitating the production of life-like deformations of such Objects.

The information included in this Background section of the specification, including any references cited herein and any description or discussion thereof, is included for technical reference purposes only and is not to be regarded as subject matter by which the scope of the invention as defined in the claims is to be bound.

SUMMARY

Present embodiments are directed to systems and methods for deforming an object. In accordance with at least one embodiment, a method for deforming a virtual geometric object substantially real-time includes the operations of relaxing a hi-res mesh defining a shape of the object, wherein the hi-res mesh corresponds to a proxy mesh, relaxing the hi-res mesh at least once, recording the location of the elements of the hi-res mesh as relaxed, deforming the proxy mesh, adjusting the location of one or more elements on the hi-res mesh relative to the as deformed proxy mesh, relaxing the adjusted elements on the deformed hi-res mesh, and adjusting the location of the hi-res mesh as deformed in view of the previously recorded elements of the hi-res mesh as relaxed both pre and after deformation.

In accordance with at least one embodiment, the systems and methods include determining an amount of creasing of the object arising from a given deformation thereof and adjusting the location of one or more elements of a mesh defining such object in view of the creasing.

In accordance with at least one embodiment, systems and methods for deforming a virtual geometric object includes at least one or more of the operations of: obtaining a hi-res mesh for a virtual geometric object; obtaining a proxy mesh of the object; selecting a first hi-res mesh element; identifying a first proxy mesh element relative to the selected first hi-res mesh element; determining a first hi-res mesh element proxy system location; relaxing the first hi-res mesh element; selecting a first relaxed hi-res element instance corresponding to the first hi-res mesh element; determining a location of the selected first relaxed hi-res mesh element instance on the first proxy mesh coordinate system; obtaining a second deformed proxy mesh of the object, wherein the second deformed proxy mesh includes a deformed proxy mesh element reflecting a re-positioning of the first proxy mesh element on the deformed proxy mesh; deforming the hi-res mesh by positioning the first hi-res mesh element proximate to the deformed first proxy mesh element; identifying, on the deformed hi-res mesh, a deformed hi-res mesh element corresponding the first hi-res mesh element; identifying, on the second deformed proxy mesh, a deformed proxy mesh element, wherein the deformed proxy mesh element corresponds to the first proxy mesh element; determining the location of a first hi-res mesh element in the deformed proxy system, wherein the location determined is the location of the first hi-res mesh element in the virtual space defined by a coordinate system associated with the second deformed proxy mesh; relaxing the first hi-res mesh element; selecting a relaxed deformed hi-res mesh element instance corresponding to the deformed hi-res mesh element; determining a location of the selected relaxed deformed hi-res mesh element instance on the first proxy mesh coordinate system; and adjusting the location of the first hi-res mesh element by the determined location of the selected relaxed deformed hi-res mesh element instance.

Per at least one embodiment, the systems and methods are configurable for use with a hi-res mesh that utilizes at least 50,000 vertices to define a shape of the object.

Per at least one embodiment, the systems and methods are configurable for use with a hi-res mesh that cannot be processed and presented on a computer display device real-time and at a frame rate of at least 24 frames per second using a commonly available computing device. In at least one embodiment, such a commonly available computing device comprises a 64-bit central processing unit and at least 4 GB of random access memory.

Per at least one embodiment, the systems and methods are configurable for use with a proxy mesh which corresponds to the hi-res mesh and includes less than 50,000 vertices to define a given object.

Per at least one embodiment, system and methods are configurable for use with a hi-res mesh which includes over 100,000 vertices to define a shape of an object.

Per at least one embodiment, system and methods are configurable such that a hi-res mesh defines a shape of an object by utilizing two or more polygons, each polygon having at least three edges. Per at least one such embodiment, operations include determining at least one neutral surface tension for the object based upon a measured length of at least one of the at least three edges of at least one of the two or more polygons.

Per at least one embodiment, a hi-res mesh may include at least one vertex. The vertex may be defined in terms of at least one vector. Further, the systems and methods disclosed herein may include the operations of determining at least one neutral surface tension for the object based on a magnitude of the at least one vector.

Per at least one embodiment, a first hi-res mesh may be generated real-time or retrieved from a storage location, if previously generated.

Per at least one embodiment, a first hi-res mesh may be used to define two or more portions of an object.

Per at least one embodiment, an element of a hi-res mesh element may be selected. Such an element may comprise a vertex on the hi-res mesh. Per at least one embodiment, a first hi-res mesh element may comprise an edge of a polygon. The hi-res mesh may define a shape of object using two or more polygons.

Per at least one embodiment, systems and methods may include identifying on a proxy mesh at least two vertices defining a polygon further defining a shape of an object. Further, such operations may include identifying a connectivity between each of the at least two vertices, obtaining and/or utilizing an animation skeleton, and binding a proxy mesh to an animation skeleton. It is to be appreciated that an animation skeleton may be utilized by at least one embodiment to facilitate the deformation of an object or portion thereof. Such deformations may occur manually, semi-automatically or automatically.

Per at least one embodiment, a first hi-res mesh element may include a first hi-res mesh vertex and a location of the first hi-res mesh vertex may be defined in a virtual space relative to a first coordinate system.

Per at least one embodiment, a first proxy mesh element may include at least one first proxy mesh vertex, and operations may include selecting at least one first proxy mesh vertex closest in a virtual space to a first hi-res mesh vertex. Per at least one embodiment, a location of at least one first proxy mesh vertex may be defined in a virtual space relative to a second coordinate system.

Per at least one embodiment, system and methods may include various matrix and coordinate space transformation such as an operations of determining a first hi-res mesh element proxy system location may include the operations of generating a first transform matrix for converting a location of the first hi-res mesh vertex from a first coordinate system into a second coordinate system.

Per at least one embodiment, system and methods may include operations of inverting a first transform matrix to generate a first inverse transform matrix. In accordance with at least one embodiment, a first inverse transform matrix may be used to facilitate identifying a location of a first hi-res mesh vertex on a proxy mesh relative to the first coordinate system.

Per at least one embodiment, systems and methods may include the operations of multiplying the location of a first hi-res mesh vertex by a first inverse transform matrix.

Per at least one embodiment, a hi-res mesh may include a second through $n^{th}$ hi-res mesh element. Systems and methods may include determining for at least one of the second through $n^{th}$ hi-res mesh elements an $n^{th}$ hi-res mesh element proxy system location.

Per at least one embodiment, systems and methods may include the operations of determining an $n^{th}$ hi-res mesh element proxy system locations for each of $n^{th}$ hi-res mesh elements.

Per at least one embodiment, systems and methods may include use of a first hi-res mesh element including a portion of a polygon used to define the object. Per at least one embodiment, systems and methods may include the operations of relaxing a first hi-res mesh element results in a hi-res mesh being smoothed while maintaining at least one of a pre-relaxation size, a volume or detail characteristic associated with the polygon.

Per at least one embodiment, systems and methods may include use of a MAYA software application program or the like which is executing on a currently compatible computing device.

Per at least one embodiment, systems and methods may include a selected first relaxed hi-res mesh element that includes a first relaxed hi-res mesh vertex. Per at least one embodiment, a location of the first relaxed hi-res mesh vertex may be defined in a virtual space relative to a coordinate system.

Per at least one embodiment, systems and methods may include the operations of determining a location of a selected first relaxed hi-res mesh element instance on a first proxy mesh coordinate system. Such operations may include generating a first relaxed transform matrix for converting a location of a selected first relaxed hi-res mesh element from one coordinate system into another coordinate system. Such operations may include inverting a first relaxed transform matrix to generate a first relaxed inverse transform matrix, wherein a first relaxed inverse transform matrix facilitates identifying a location of a first relaxed hi-res mesh vertex on a proxy mesh relative to a first coordinate system. Such operations may include multiplying a location of a first relaxed hi-res mesh vertex by a first relaxed inverse transform matrix.

Per at least one embodiment, systems and methods may include the operations of relaxing a first hi-res mesh element and thereby obtaining at least two instances of a first relaxed hi-res mesh element. Such operations may include determining a location for each instance of the first relaxed hi-res mesh elements.

Per at least one embodiment, systems and methods may include a hi-res mesh that includes a second through nth hi-res mesh element. Such systems and methods may include the operations of relaxing at least one of the nth hi-res mesh elements, resulting in at least one nth relaxed hi-res mesh element instance. Such operations may include determining for each of the nth relaxed hi-res mesh element instances a location of the selected nth relaxed hi-res mesh element instance on the first proxy mesh coordinate system.

Per at least one embodiment, systems and methods may include the operations of adjusting an element of an animation skeleton from a first state to a second state, wherein the element of the animation skeleton is bound to a first proxy mesh element and the adjusting of the element of the animation skeleton results in a corresponding adjustment of the first proxy mesh element. Per at least one embodiment, a first state is at least one of a first position and a first orientation in a virtual space and the second state is at least one of a second position and a second orientation in the virtual space. Per at least one embodiment, a change of at least one of the position and orientation of an animation skeleton from a first state to a second state may result in changes at least one of a position and an orientation of a first proxy mesh element.

Per at least one embodiment, systems and methods may include operations of defining and/or use a location and orientation of an element of an animation skeleton in view of a specified coordinate system.

Per at least one embodiment, systems and methods may include a first hi-res mesh element proxy system location that corresponds to a location of a first hi-res mesh element in a coordinate system used to identify the location of a first proxy mesh element in a given virtual space prior to a deformation of an object.

Per at least one embodiment, systems and methods may include the operation of deforming the hi-res mesh by an animator manually adjusting a location of a first hi-res mesh element to be proximate to a location of a deformed first proxy mesh element.

Per at least one embodiment, systems and methods may include automatically deforming a mesh with a deformation of an animation skeleton corresponding to the proxy mesh.

Per at least one embodiment, systems and methods may include use of a hi-res mesh that includes two or more hi-res mesh elements and an operation of deforming a hi-res mesh element may be accomplished automatically for each of the remaining two or more hi-res mesh elements.

Per at least one embodiment, systems and methods may include use of a hi-res mesh that defines a shape of an object by utilizing two or more polygons, each polygon having at least three edges, and based on a length of at least one of the at least three edges for at least one of the two or more polygons prior to a deformation of the hi-res mesh, the operations of determining at least one neutral surface tension for the object and, after deformation of the hi-res mesh, determining at least one deformed surface tension for the object.

Per at least one embodiment, systems and methods may include determining a creasing of a mesh for an object based on a deformation of the mesh by comparing at least one neutral surface tension determined prior to a deformation of the mesh with at least one surface tension determined after deformation of the mesh.

Per at least one embodiment, systems and methods may include use of a vertex for a first hi-res mesh element and a deformed hi-res mesh element include at least one vertex. Per at least one embodiment, systems and methods may include the operations of selecting the at least one vertex in the deformed hi-res mesh element closest in a virtual space to a corresponding vertex in the first hi-res mesh.

Per at least one embodiment, systems and methods may include use of a deformed proxy mesh element that includes at least one deformed proxy mesh vertex and a first proxy mesh element selected pre-deformation of the proxy mesh that includes at least one first proxy mesh vertex. Per at least one embodiment, systems and methods may include the operations of selecting the at least one deformed proxy mesh vertex closest in a virtual space to the selected first proxy mesh vertex.

Per at least one embodiment, systems and methods may include use of a single coordinate system to define the location of each of a deformed proxy mesh vertex and a first proxy mesh vertex in a virtual space. Per at least one embodiment, systems and methods may include the operations of generating an inverse deformed transform matrix and multiplying a first hi-res mesh element proxy system location by an inverted deformed transform matrix.

Per at least one embodiment, systems and methods may include the operations of determining a location of a selected relaxed deformed hi-res mesh element instance on a first proxy mesh coordinate system using a relaxed inverse transform matrix.

Per at least one embodiment, systems and methods may include the operations of determining a location of a selected relaxed deformed hi-res mesh element instance on a first proxy mesh coordinate system by multiplying a relaxed hi-res mesh element location specified in a virtual space according to a coordinate system utilized for a proxy mesh times a relaxed inverse transform matrix.

Per at least one embodiment, systems and methods may include the operations of determining if any creasing has occurred from a deformation of a hi-res mesh and, if deformation has occurred, adjusting a location of a first hi-res mesh element based on the determined creasing.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. A more extensive presentation of features, details, utilities, and advantages of the present invention as defined in the claims is provided in the following written description of various embodiments of the invention and illustrated in the accompanying drawings.

DETAILED DESCRIPTION

Figure 1:
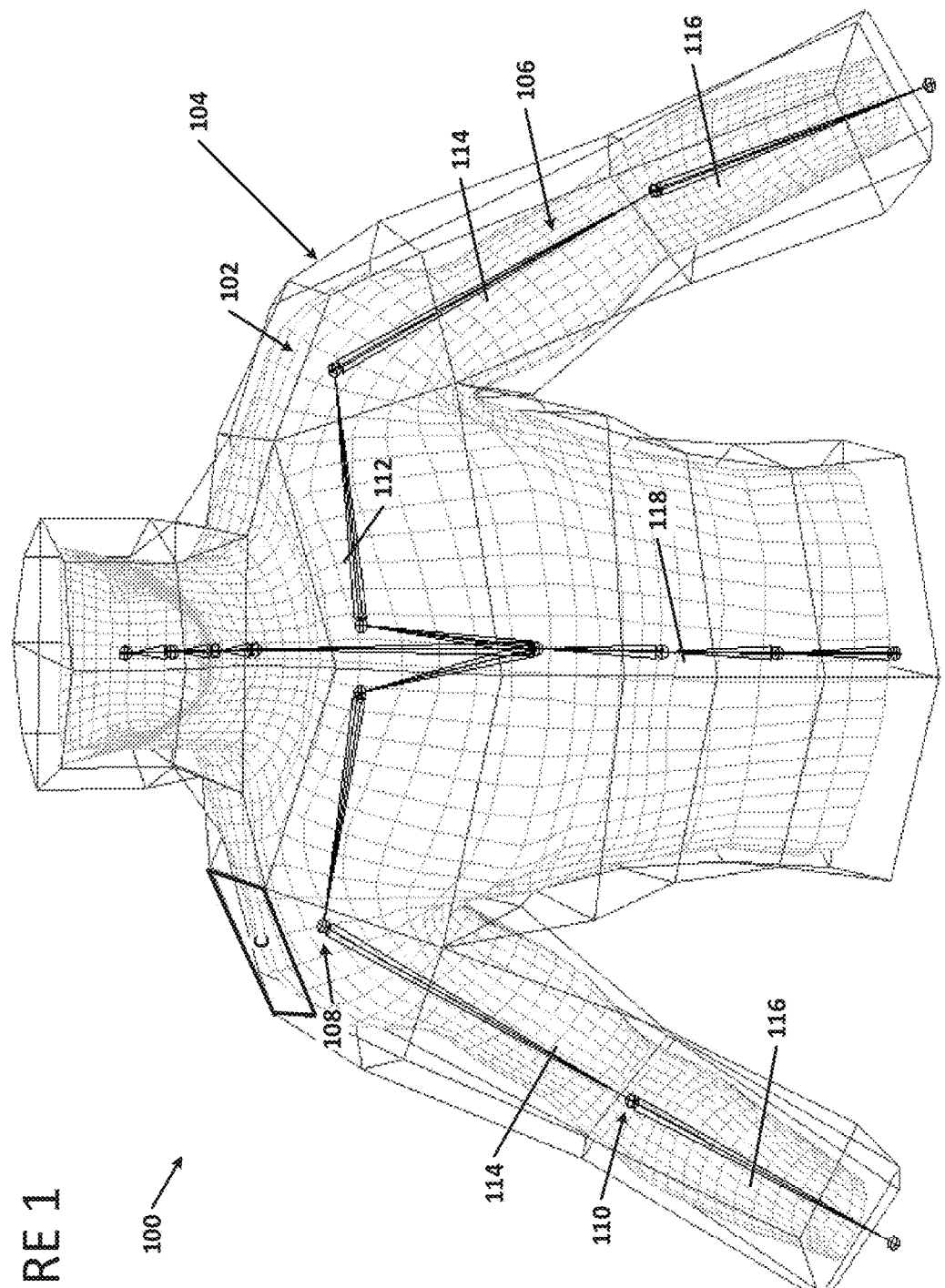
FIG. 1 is a pictorial represent of a torso portion of an Object to be deformed in accordance with at least one embodiment of the present disclosure.

In computer graphics and related fields, persons, characters, objects and other items (collectively, each an "Object") can be represented visually, in three-dimensions using one or more meshes onto which one or more skins, textures or other processes are later applied, on a rendering device such as a computer screen, a visual head-set, or other display technologies. For example, a character such as a comic book super-hero, a good (such as a vehicle), or an item of nature (such as a tree or cloud) may be represented, manipulated and ultimately rendered on a human visible display device as a combination of one or more meshes, where such one or more meshes define the shape of the Object. Commonly, such meshes include a collection of polygonal shapes formed from three or more vertices, edges and faces. These polygonal shapes may include a collection of polyhedral objects such as triangles, quadrilaterals, pentagons, hexagons, and others polygons (hereafter, each a "polygon").

Likewise, various types of textures, skins, lighting effects and other graphical arts production processes may be applied onto one or more of these meshes and/or individual polygons to provide the substance ("look and feel") of an Object. For example, a first texture might resemble a portion of the skin of a human, an animal, artificial life form or otherwise, whereas a second texture might resemble a portion of an item of clothing. It is to be appreciated, that virtually any type of Object may be represented by such a collection polygons as further defined by various textures/skins and other video production processes. The application of such skins and/or other video production processes is beyond the scope of this disclosure which is directed to the animation of Objects through the deformation of the before-mentioned meshes.

More specifically, Objects can be "animated" for presentation to a human viewer by deforming some or all of the mesh defining the shape of a given Object or a portion thereof (each individually and collectively an Object). For example, an item such as leaves on a tree might be animated to blow in the wind by slowly shifting the position of portions of certain leaves (e.g., to flutter) from frame to frame, while other portions of the tree (e.g., the trunk) remain steady, with different polygons forming the leaves versus the trunk of such tree. Similarly, a character (human-life or otherwise) might be animated to run, jump, leap, pose or undergo any of a potentially infinite number of positional changes and movements (including facial movements). Such changes in any such given Object's shape is herein described as being a "deformation" of an Object or a portion thereof, where each such portion itself is an Object.

It is to be appreciated that as the number of polygons used in any given mesh representing all or a portion of a shape of a given Object increases, the resolution, detail and/or specificity of the underlying shape of a given Object (and ultimately its final appearance) likewise increases. Accordingly, computer graphic animators often seek to utilize meshes that contain hundreds of thousands of polygons, hereafter "high resolution" ("hi-res") meshes, to provide the structure and shape for the final life-like Objects ultimately presented to a viewer. As used herein, a hi-res mesh is generally defined for at least one embodiment and as of the filing date of this application, as a mesh having more than 50,000 vertices and a mesh that cannot be deformed and such deformations processed and presented in real-time at 24 frames per second on a display device using a commonly available computing device. In accordance with at least one embodiment, such a commonly available computing device include, for example, a 64-bit multi-core processor, 4 GB of random access memory, 4 GB of storage, an INTEL™ HD Graphics P4000™ graphics card or similar graphics card, a MICROSOFT™ WINDOWS 7™ or comparable operating system, a MICROSOFT™ INTERNET EXPLORER™ or comparable web browser and a three button mouse or comparable user input device. It is to be appreciated that other configurations of commonly available computing devices are available today and also are generally incapable of providing the desired real-time 24 frames per second processing of hi-res meshes, such as those presently having greater than 50,000 vertices. It is also to be appreciated that as computing powers and capabilities of commonly available computing devices, such as the before mentioned device, continue to increase, the number of vertices capable of being processed in real-time at 24 frames per second will also increase. As the capabilities of such commonly available computing devices increase in processing speed, memory capabilities, cores, threads executing and otherwise, such later arising commonly available computing device will likely be able to maintain real-time processing at 24 frames per second of meshes having vertices greater than 50,000 vertices. Accordingly, the number of vertices in a mesh defining, with respect to which then commonly available computing devices as of any given future date, a lower limit boundary designating hi-res meshes from lower resolution meshes is expected to increase and is to be determined based upon whether such then commonly available computing devices are able to maintain real-time 24 frames per second mesh deformation processing. If not, then a given mesh at issue with respect to a given Object or collection thereof to be deformed is considered for purposes of the present disclosure to be a hi-res mesh.

Further, it is to be appreciated that various levels of detail may be used to represent the shape of a given Object using a collection of polygons. For example, and as shown in FIG. 1, a hi-res mesh 102 representing the torso 100 of an Object might contain hundreds of thousands of individual polygons. Likewise, the number of polygons used to define various sub-components of such torso can vary, as desired by an animator. For example, the animator may use less polygons when describing the shape of a shoulder area of the illustrative torso Object of FIG. 1. Likewise, more polygons might be used to describe portions of an Object in greater detail, such as a neck area of the illustrative torso Object of FIG. 1. It is to be appreciated that the number of polygons used in any given portion of an Object may vary, as desired by a given animator for a given project. Further, it is to be appreciated that the meshes depicted in the Figures provided in this disclosure are intended for illustrative purposes only and, for ease of explanation and description, and generally include significantly less than the 50,000 meshes used to define a hi-res mesh using today's commonly available computers.

It is to be appreciated, that as the resolution of a mesh increases (where the resolution increases, for example, by increasing the number of polygons defining a given Object), animating the motion of such Object from one frame to a next and/or across a sequence of frames can become computationally expensive. Instead of only a few vertices, edges and faces perhaps needing to be deformed, from frame-to-frame, hundreds of thousands of such elements (each forming a polygon) may need to be deformed. Herein, "computational expense" means for a given hardware and underlying operating system environment, the amount of time needed for such computing environment to perform the calculations necessary to perform and render on a display device a desired deformation of an Object. Desirably, the computational expense of any given deformation is less than a desired animator's acceptable wait or idle time. For most commercial applications, an animator's wait or idle time is desirably less than one-half of a second (0.5 seconds) such that the computing environment presents such deformations substantially real-time, i.e., without any humanly perceptible delay. Accordingly and as used herein, "real-time" processing occurs when the result of a user instructed deformation of a given mesh appears on a display device without a user perceptible delay arising between the time of entry of a command requesting the deformation and the rendering of the resulting deformation on a display device.

For example and in accordance with at least one embodiment, animating the Object of FIG. 1 to lift an object over a virtual head, to mimic life-like behavior, requires the movement of the torso, arms, head, and other body components. Each of the movements of these body parts of the torso Object may occur independently or dependently of any other body part, as desired by a given animator or project. For example, the neck might swivel on a first axis that is different than the axis (and coordinate system) about which a shoulder rotates. Ideally, such animations of these Objects appear to occur without any human perceptible delay while maintaining a high degree of resolution in shape details throughout the deformation.

To address such concerns with animation idle time and other animation productivity concerns, for at least one embodiment and in addition to the before mentioned hi-res mesh, a second lower-resolution mesh (a "proxy" mesh) such as proxy mesh 104 may be utilized to more generally, and/or at a higher level of abstraction, define the structure and/or shape of an Object. As shown in FIG. 1, the proxy mesh 104 generally represents the structure and shape of the torso 100 Object, as depicted in greater resolution by hi-res mesh 102. The proxy mesh 104, however, uses a small fraction of the number of polygons used to define the torso 100 Object on the hi-res mesh 102. As further shown for the embodiment of FIG. 1, the proxy mesh 104 is configured to surround and/or encapsulate a hi-res mesh 102, or a portion of the hi-res mesh.

As used herein, a proxy mesh is generally defined as a lower resolution mesh that corresponds to a hi-res mesh and includes a lesser number of vertices such that a deformation of the lower resolution mesh can be processed in real-time at 24 frames per second using a then commonly available computing device as of a given date in time, such as the commonly available computing devices available at the time of the filing of this application and as described above. In at least one embodiment and in accordance with commonly available computing devices available as of the filing date of this application, a proxy mesh has less than 50,000 vertices.

It is to be appreciated that just as the expected future increases in computing power will result in an increase in the threshold defining the lower limit at which a hi-res mesh exists, a corresponding increase in the threshold defining the upper limit at which a proxy mesh can be processed real-time at 24 framer per second will also increase. In accordance with at least one embodiment, such threshold is measured in terms of the number of vertices in a given mesh or portion thereof desiring to be deformed at any given time. It is to be appreciated that in accordance with other embodiments, the threshold may be measured in accordance with other parameters, such as the number of faces, polygons, edges or other parameters defining any given mesh including but not limited to the size of the mesh overall to be deformed at any given time. Further, it is anticipated that in future embodiments, the boundary thresholds between hi-res meshes and proxy meshes will increase from today's typical 50,000 vertices threshold to 75,000 vertices, 100,000 vertices and ever higher as commonly available computing power continues to increase at any given time arising over the 20+ year lifespan for any patent claiming priority to the present disclosure.

As further shown in FIG. 1 for at least one embodiment of the present disclosure, an animation skeleton 106 can be utilized to model the Object at an even higher level of abstraction. The animation skeleton 106 is generally a stick figure representation of the shape of a given Object. The animation skeleton 106 also can be configured to represent locations of joints and/or axis upon which one or more other skeleton components can be moved, rotated or otherwise reconfigured. For example, in the embodiment shown in FIG. 1, the animation skeleton 106 is configured to model structural components of the torso 100 Object by modeling joint locations such as the shoulder joints 108 and elbow joints 110, while also modeling the shape of the torso by including the pectoral regions 112, the Humerus 114 bones, the Ulna 116 bones, abdominal muscles 118 and other structural elements of an Object, such as torso 100 Object illustrated in FIG. 1.

For at least one embodiment, a relationship is defined between each polygon of a hi-res mesh 102 and of a corresponding polygon on a proxy mesh 104. In at least one embodiment, such relationship is defined in terms of vertices of polygons. But, it is to be appreciated, that in other embodiments the vertices, edges and/or faces of one or more polygons, as defined for example by one or more vectors, may be utilized to define such relationships. Likewise, in accordance with at least one embodiment, a relationship is defined between each polygon of a proxy mesh 104 with a corresponding element of an animation skeleton 106.

Further, an Object may be mapped to its own coordinate system and/or another coordinate system. For example, the vertices of the polygons of a hi-res mesh 102 may be expressed in a first coordinate system, while the vertices of the polygons of proxy mesh 104 may be expressed in second coordinate system. Similarly, the components of a structural animation 106 may be expressed in a third coordinate system. Further, it is to be appreciated that portions of a torso Object, such as the bones depicted by the animation skeleton 106, may be positionally expressed in terms of their own coordinate system. For example, the portion corresponding to a movement of a forearm about an elbow joint (which for this explanation we assume provides for motion in only a given plane), may be expressed in a first coordinate system while the rotation of a Humerus bone 114 about a shoulder joint 108 may be expressed in a different coordinate system. It is to be appreciated that the location of any given vertex, edge, face, polygon, element or joint used to describe a mesh or animation skeleton element for a given Object in a first coordinate system may be expressed in terms of another coordinate system by the use of one or more transformation matrices, the use of which are well known in the art. Such transformation matrices may also be used to express the location of a given Object, in a given frame, on a hi-res mesh using a coordinate system associated with a proxy mesh and vice versa.

Figure 2:
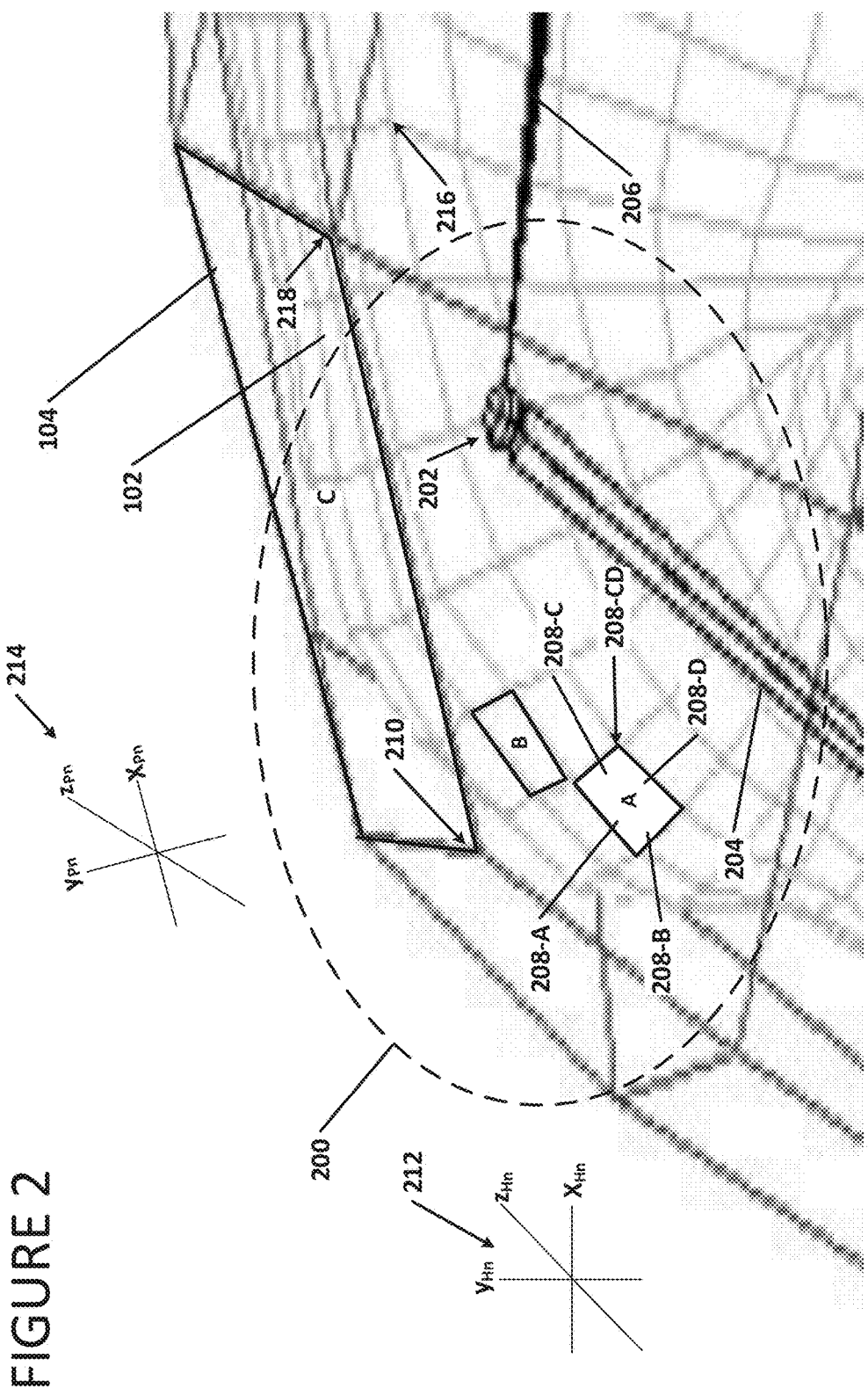
FIG. 2 is a magnified view of a shoulder region of the torso portion of the Object of FIG. 1.

More specifically, FIG. 2 provides a magnified view of the hi-res mesh 102, proxy mesh 104 and animation skeleton 106 being used to define the structure and shape of a portion of a given Object, such as shoulder area 200 of torso 100. As shown in FIG. 2, the hi-res mesh 102 models the shoulder area 200 with a high level of specificity, as represented by the significantly larger number of polygons used. For this demonstrative illustration, the representative shoulder area 202 (as encompassed by the shown ellipse), is modeled by 40+ distinct polygons on the hi-res mesh 102. Comparatively, the proxy mesh 104 uses fewer polygon and in this example, just 6 polygons. Further, the animation skeleton 206 uses as few as three animation skeleton elements. Each of these elements can identified, in space, using distinct coordinate systems. Such as coordinate system 212 used for hi-res mesh and coordinate system 214 being used for the proxy mesh. Again, each of these polygons (and the vertices, edges and/or faces thereof) can be defined in terms of a given coordinate system and/or transformed into a second coordinate system by use of matrix transformations.

It is also to be appreciated that the characteristics of a given polygon can be defined by the length of its edges, the angles formed by the intersection of such edges, with such intersections each forming a vertex, and the location of each vertex in a coordinate space. For example, polygon "A" can be defined by its elements such as by the length of each of its four edges, 208-A, 208-B, 208-C and 208-D, its vertices, the angles formed by the intersection of such edges at each vertex, such as vertex 208-CD, and the location in an X-Y-Z coordinate space, such as coordinate system 212 used in this example for the hi-res mesh. Similarly, polygon "A" can be presented as one or more vertices, and defined by one or more vectors emanating from such vertices. Such definition can occur in a first coordinate system, such as a hi-res coordinate system and be transformed into a second coordinate system 214, such as one used for the defining the location of polygons (or elements thereof) with respect to a proxy mesh.

Further, polygon A can also be defined by the length of edges 208-A to 208-D, the angles formed thereby and/or the position of the vertices formed thereby. Each of these edge lengths, for example, can be defined to represent a plurality of first surface tensions of a given modeled section (e.g., polygon A) of the Object. Likewise, a second polygon "B" can also be considered to represent a plurality of first surface tensions relating to a first state of that portion of the Object. The size, orientation and locations of these surface tensions may be uniform or disparate. For example, the size, orientation and shape of polygon A's edges may vary from those of polygon B. These surface tensions can be used as a baseline for later modeling of the behavior of an Object as it is deformed. That is, it is to be appreciated that as an Object deforms from a first state (e.g., a first position and/or orientation in a given coordinate system) to a second state (e.g., a second position and/or orientation in the same given coordinate system), the increase or decrease in a surface tension (by lengthening, rotation or otherwise) may be used to model the behavior of an underlying shape of an Object. For example, a flexing of a bicep muscle (as modeled by moving an Ulna bone towards a Humerus bone (on a given arm) should result in a bulging of the shape corresponding to a bicep muscle area, when human life-like deformations are desired. A need for such bulging can be modeled by a decrease in the surface tension of polygons corresponding to a bicep area, with a corresponding increase in the surface of polygons corresponding to a tri-cep area, of a same arm of a given Object.

Further, when modeling life-like interactions, it is to be appreciated that the size and shape of a given polygon may vary over time with position, orientation and rotation thereof. For example, when modeling the raising of a person's arm into a "T" configuration, it is to be appreciated that both the location of polygon's A and B and the respective sizes and shapes of the edges forming such polygons might contract, expand, rotate, displace or remain unchanged. For example, when an arm is raised into a raised "I" position (for example, when modeling the raising of an Object's virtual hand to answer a question), such deformation might occur only along a given axis such that edges 208-A and 208-D might shorten as well as being repositioned higher on a given X axis. Such deformations thereby representing a contraction of the top portion of a shoulder area and (if shown) an extension of one or more polygons forming a corresponding arm pit area of a torso. Meanwhile, edges 208-B and 208-C might remain unchanged. Similarly, when the arm is raised and rotated backwards (as would occur, for example, if one were to emulate a throwing of a ball), edges 208-B might lengthen while edge 208-C might shorten, indicating a rotation (by extension) of one portion of a shoulder area and a contraction of another portion. Accordingly, it is to be appreciated that when modeling an Object, the position of vertices and/or the length and/or angles formed by edges of polygons may be used to model deformations of an Object from a first state to a second state.

For purposes of this disclosure, the respective size and shape of a polygon in a first state is considered a first surface tension and the respective size and shape of that polygon in a second state, arising after some deformation of the Object, is considered to be a second surface tension. It is to be appreciated that a plurality of second surface tensions may arise with respect to any given polygon throughout a range of deformations from a first state to a final state. Likewise, it is to be appreciated that two or more polygons may be collectively used to model the surface tension of an Object across one or more states.

It is also to be appreciated that as the number of polygons and/or structural elements utilized to model a given portion of an Object increases, the computational expense necessary to generate real-time visualizations on a display device of the deformation of such polygons and elements while modeling movement or deformation of an Object also increases. Accordingly, for at least one embodiment of the present disclosure, the visualization of a deformation of an Object occurs substantially real-time by an animator first manipulating an animation skeleton 106.

Figure 3:
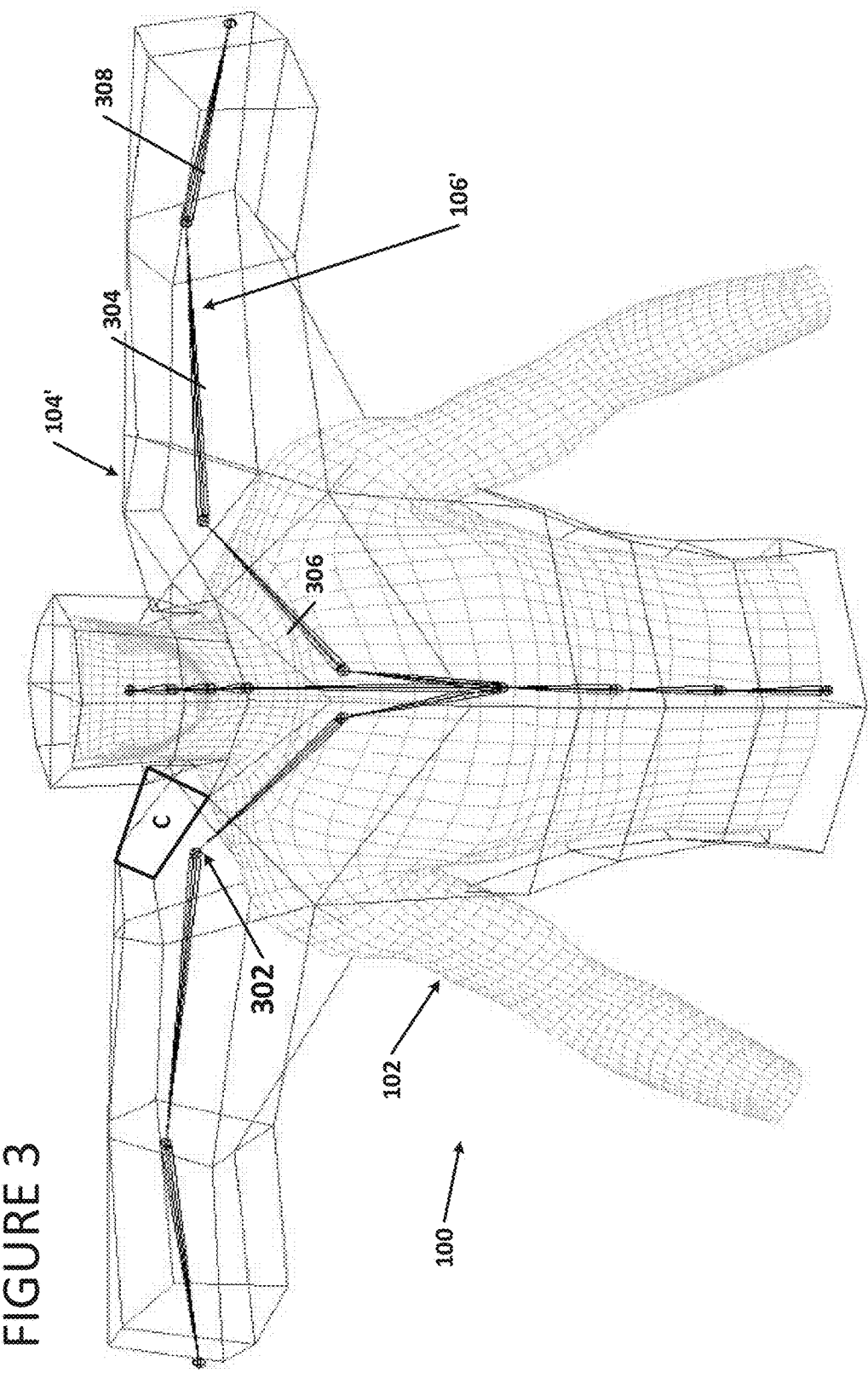
FIG. 3 is a pictorial representation of a deformation of a portion of the torso for the Object represented in FIG. 1 after manipulation of an animation skeleton and a bound thereto proxy mesh in accordance with at least one embodiment of the present disclosure.

For example as shown in FIG. 3, the deformation of the torso 100 from a relaxed (or hanging arm) position to a second, deformed (raised shoulder) position can be modeled and visually represented as first a relocation of one or more animation skeleton elements 106', such as a raising of a shoulder joint element 302, a bicep element 304, a pectoral element 306 and a forearm element 308 from each of a respective first state to a second state. While FIG. 3 illustrates a positioning of a raised arm at a final state of approximately 90° (or in a "T" configuration) above a first state of a relaxed arm, as shown in FIG. 1, it is to be appreciated that any number of incremental movements from the relaxed state to the final state may be modeled and captured as frames, as a given animator may desire for any given project.

According to at least one embodiment, software tools such as the AUTODESK™ provided MAYA™ software application may be utilized by an animator to visually represent, model and deform an Object by manipulating (e.g., re-positioning, rotating, or otherwise) one or more animation skeleton elements 106'. It is also to be appreciated that various other forms of animation and graphical design software applications may be utilized in conjunction with the embodiments of the present disclosure to perform such deformations and the various embodiments of the present disclosure are not limited to the use of any particular graphical design or animation software applications.

At least one embodiment of the present disclosure further facilitates substantially real-time visualization of a desired life-like deformation of an Object by binding, or otherwise relating, one or more polygons (or one or more of the vertices, edges or faces of such polygon) of a proxy mesh for an Object to one or more corresponding animation skeleton elements. For example and as shown in FIGS. 1-3, proxy mesh polygon "C" can be bound to joint element 302 such that a deformation of the joint element 302 from a first state (e.g., a relaxed arm or "I" configuration) to second state (e.g., a raised arm or "T" configuration) results in a corresponding deformation of polygon C. As shown in FIG. 3, by creating such relationships (between animation skeleton elements and proxy mesh polygons) a crude approximation of a desired deformation (in this example, the raising of an Object's arms from an "I" into a "T" configuration) can be performed, by an animator, and generated for visualization on a display device by the computing environment substantially real-time.

Such approximation of an Object's deformation, however, is often crude, as none of the structural and shape details provided by hi-res mesh 102 are likewise deformed and substantially real-time visually presented to an animator. As shown in FIG. 3, the proxy mesh 104' has been deformed to correspond to the desired deformation of the animation skeleton 106'.

As discussed above, to accomplish such deformation of a hi-res mesh, an animator will often have to manually manipulate one or more, and often each, polygon of a hi-res mesh into a desired position. Such approaches are labor and time intensive. Likewise, a simple binding of the various polygons (and/or elements thereof) in a hi-res mesh representing an Object to a proxy mesh, an animation skeleton, or both is computationally expensive and often results in non-substantially real-time visualizations of a desired deformation on a display device or results in rendering errors which, to correct, often require manual intervention and manipulation of an Object's polygons.

Deformation Process

In accordance with at least one embodiment of the present disclosure, the before noted concerns with computational efficiency and providing high resolution real-time deformations of an Object is addressed by the process shown in FIGS. 4A-4D. It is to be appreciated that the operations shown in FIGS. 4A-4D and described below may or may not be utilized in every given embodiment of the present disclosure and need not necessarily occur in any given or pre-determined order, except where logic dictates otherwise.

Figure 4A:
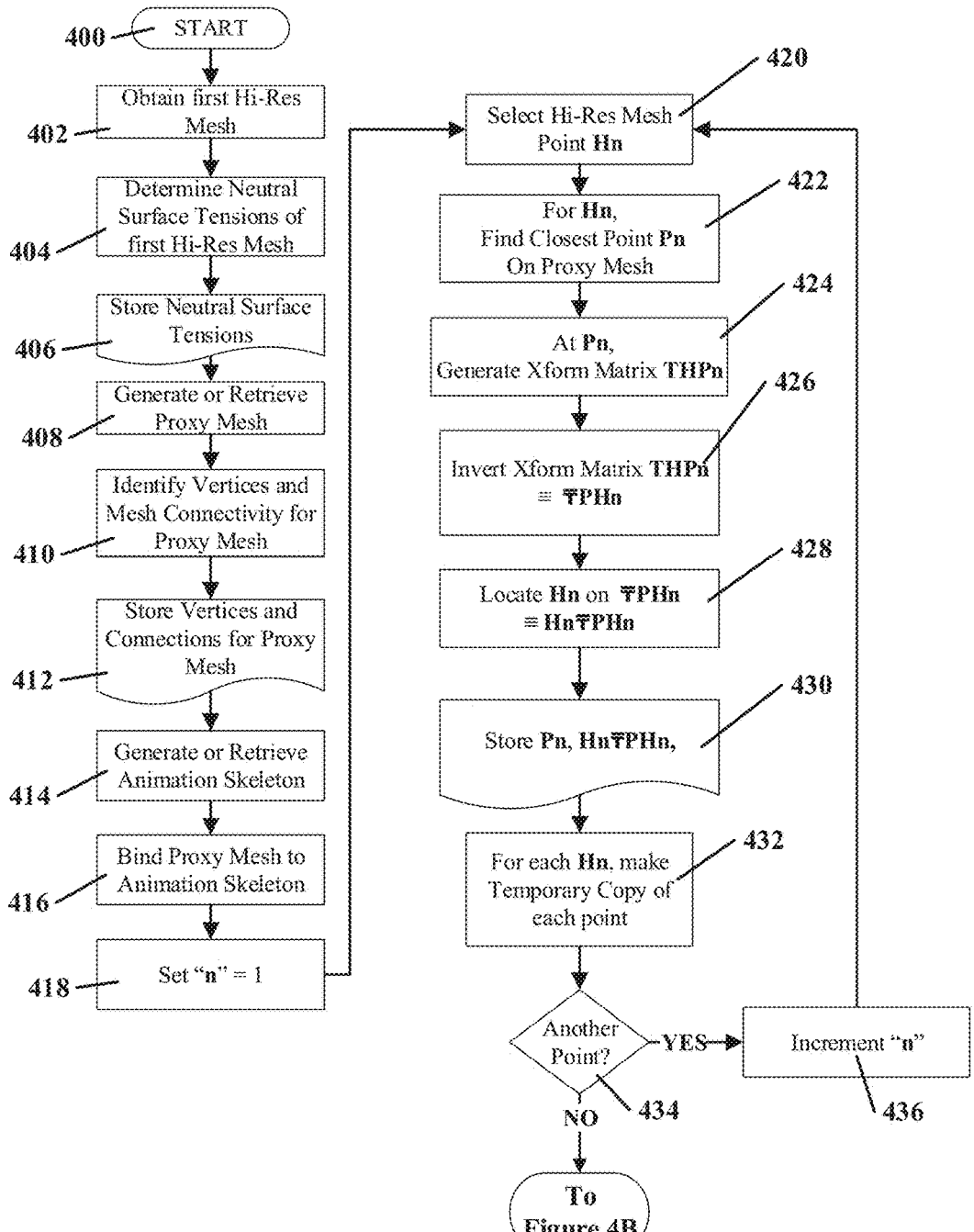
FIGS. 4A-4D are a flow chart depicting one sequence of operations for automating virtual geometry deformations in accordance with at least one embodiment of the present disclosure.

As shown in FIG. 4A, for at least one embodiment of the present disclosure the process begins with obtaining a first hi-res mesh (Operation 402). It is to be appreciated that the first hi-res mesh may be retrieved from a local, remote, cloud-based or other storage device, computer memory, generated real-time or otherwise obtained. Further, it is to be appreciated that the first hi-res mesh can be generated using any available computer graphics application program, that supports the creation and/or manipulation of computer generated Objects using mesh diagrams. Example of such computer graphics programs include, but are not limited to, the MAYA™ program, BLENDER™ sold by The Blender Foundation, CINEMA 4D™ sold by Maxon Computer GmbH, and others.

The process further includes determining the neutral (i.e., pre-deformation) surface tensions of the first hi-res mesh (Operation 404). For at least one embodiment, the neutral surface tensions can be determined with respect to each edge of every polygon utilized in the first hi-res mesh. For example, the neutral surface tension of edges 208-A to 208-D (FIG. 2) may be determined based on a length of each such edge. Similarly, the neutral surface tensions may be determined based on a magnitude for each vector associated with one or more vertices in a mesh. For at least one second embodiment, the process of determining the neutral surface tensions of the first hi-res mesh may be accomplished with respect to each vertex on the first hi-res mesh. For at least one third embodiment, the process of determining the neutral surface tensions may be accomplished with respect to one or more selected vertices, such as those implicated by a given future deformation of the Object or a portion thereof. For example, it is to be appreciated that the neutral surface tensions of vertices corresponding to polygons on the first hi-res mesh that model an Object's wrist area may not need to be determined when the desired, future deformation involves only a rotation of an Object's neck area and does not involve any deformation of the wrist area. For at least one embodiment of the present disclosure, the process permits an animator to select portions of a first hi-res mesh, each being an Object, for which a determination of the neutral surface tensions is desired.

In Operation 406, the determined neutral surface tensions for the first hi-res mesh (or selected sub-Objects thereof) are stored. It is to be appreciated that such storage may be accomplished using local, remote, cloud-based or other storage devices and systems.

In Operation 408, the process includes the operation of obtaining a first proxy mesh. In at least one embodiment, the first proxy mesh is obtained by generating the first proxy mesh using graphical application program(s). In at least one second embodiment, the first proxy mesh is obtained by retrieving a previously generated first proxy mesh from a data storage device. It is to be appreciated that any of the before mentioned computer graphics application programs may be used to generate the first proxy mesh and such mesh may be stored and later retrieved from any desired local, remote, cloud-based or other storage system or device. As discussed previously above with reference to FIGS. 1-3 and for at least one embodiment, the first proxy mesh encapsulates and approximates the shape of the Object, or one or more portions thereof, which correspond to the first hi-res mesh.

In Operation 410, each vertex on the first proxy mesh and the connectivity of such vertices to each other is identified and collected. As discussed above, for other embodiments, a sub-set of vertices on the first proxy mesh which correspond to one or more selected sub-Objects may be identified and the connectivity thereof collected.

In Operation 412, the identified and collected vertices and connectivity thereof calculated per Operation 410 are stored. It is to be appreciated that such storage may be accomplished using local, remote, cloud-based or other storage devices and systems.

In Operation 414, a first animation skeleton is obtained by being generated or retrieved (if previously generated). Any of the before mentioned computer graphics application programs may be used to generate the animation skeleton. The animation skeleton may be stored and later retrieved from any desired local, remote, cloud-based or other storage system or device. Likewise, the first animation skeleton generated or retrieved may correspond to an entire Object or one or more portions thereof, as desired by an animator.

In Operation 416, the first proxy mesh (or selected portions thereof) is bound, if not previously bound, to the first animation skeleton. As discussed above, the binding of the first proxy mesh to the first animation skeleton facilitates a later deformation of the Object from a first state to a second state by enabling an animator to manipulate the first animation skeletal elements versus having to manipulate individual or selected polygons or components of such polygons in the proxy mesh.

In Operation 418, a variable "n" is an integer and is set to the value of "1". Throughout this disclosure "n" is always an integer having a value $\geq 1$.

In Operation 420, an element of a mesh, referred to herein as a "point", (the $Hn^{th}$ point) on the first hi-res mesh is selected. For example, on hi-res mesh 102 (FIG. 2) vertex 208-CD is selected as the H1 point. Point Hn can be represented in a virtual space using a point matrix existing in three dimensions on each of an $n^{th}$ hi-res mesh coordinate system, such as coordinate system 212 (FIG. 2). It is to be appreciated that the coordinate system for a first point Hn may be the same as or different than the coordinate system used for any other point Hn. Herein, the point Hn is referred to as the "First Hi-Res Point n."

In Operation 422, the closest point "Pn" on the first proxy mesh 104 relative to the selected Hn$^{th}$ point is found. Point Pn can be represented as a point matrix existing in three dimensions in the virtual space on an n$^{th}$ proxy mesh coordinate system, such as coordinate system 214 (FIG. 2). For example, in FIG. 2, the closet point on the proxy mesh 104 to vertex 208-CD is vertex 210. It is to be appreciated that the coordinate system in a given virtual space for a first point Pn may be the same as or different than the coordinate system used for any other point Pn in the same given virtual space. Herein, the point Pn is referred to as the "First Proxy Point n."

In Operation 424, a first transform matrix THPn (the "First Transform Matrix n") is generated for each point Pn. The THPn transform matrix is utilized to convert the coordinate system used with respect to point Hn on the first hi-res mesh into the coordinate system used to locate point Pn with respect to the first proxy mesh coordinate system.

For example, with reference to FIG. 2 a transformation of the $X_{Hn}/Y_{Hn}/Z_{Hn}$ coordinate system 212 to the $X_{Pn}/Y_{Pn}/Z_{Pn}$ coordinate system 214 is generated for point 208-CD. It is to be appreciated, that each first hi-res point Hn may use the same or different coordinate systems to identify the location of each vertex on the first hi-res mesh. For example, the coordinate system used to represent the location of a neck element and the coordinate system used to represent the location of a shoulder element may be the same coordinate system or different coordinate systems. For at least one embodiment, coordinate systems may differ amongst the portions of an Object to be deformed, with a first coordinate system being used for a neck area and a second coordinate system used for a shoulder area. Likewise, it is to be appreciated that each first proxy point Pn may use a same or different coordinate system to identify the location of each vertex on a first proxy mesh. Accordingly, it is expected that different coordinate systems may be utilized to locate different vertices on a first hi-res mesh, on a first proxy mesh or on both. The generation of transformation matrices, for at least one embodiment, is accomplished on a point by point basis. However, it is to be appreciated that such operation may not be necessary when a single coordinate system is used for two or more points in a respective mesh or with respect to two or more Objects to be deformed. For example, when a first coordinate system is used for all points in a first hi-res mesh and a second coordinate system is used for all points in a first proxy mesh, a single transformation matrix may be generated for all points. Similarly, the same coordinate system may be utilized to identify two or more points on both a first hi-res mesh and a first proxy mesh.

In Operation 426, the transform matrix THPn is inverted resulting in the first inverse transform matrix T̄PHn (the "First Inverse Transform Matrix n"). The first inverse transform matrix T̄PHn can be used to identify the location of point Hn on a proxy mesh relative to the coordinate system utilized for the hi-res mesh at point Hn.

In Operation 428, first hi-res point Hn is located in the first proxy mesh coordinate system by multiplying the point matrix representing the location of Hn on the first hi-res mesh (using the corresponding first hi-res coordinate system) by the first inverse transform matrix T̄PHn. Mathematically, this operation can be expressed as Hn×T̄PHn=Hn T̄PHn, where HnT̄PHn (the "First High Point on First Proxy System n") is the location of the point Hn using the first proxy mesh coordinate system utilized with respect to first proxy mesh point Pn.

In Operation 430, the first proxy mesh point Pn and Hn T̄PHn are stored. It is to be appreciated that such storage may be accomplished using local, remote, cloud-based or other storage devices and systems.

In Operation 432, once the vertex on the first hi-res mesh has been located and mapped to the first proxy mesh coordinate system, the process continues with storing a separate and temporary copy of each such point Hn that has been identified per previous operations 420-430.

In Operation 434, a determination is made as to whether another point on the first hi-res mesh is to be processed and identified as corresponding to a point on the first proxy mesh. For example and with reference to FIG. 2, it may be determined that an additional point, such as vertex 216, should be mapped to a point on the first proxy mesh and its identified location transformed to the coordinate system used for the point closest to vertex 216, such as vertex 218 on the first proxy mesh. When an additional point is desired to so be mapped and located, the variable "n" is incremented (Operation 436) and Operations 420-432 are repeated. It is to be appreciated that a determination of which vertices on a first hi-res mesh to map and locate on a first proxy mesh may be determined automatically, for example, with respect to all vertices existing for an Object to be deformed. Similarly, the identification of vertices to locate and map may occur based upon an operator's input, for example, by the operator selecting one or more of such vertices to be mapped. Further, when the points on the hi-res mesh and on the proxy mesh use the same coordinate system, Operations 424-428 are not needed and in Operation 430 only the First Hi-Res Point n, Hn is stored. The process then continues with Operation 438 on FIG. 4B.

Figure 4B:
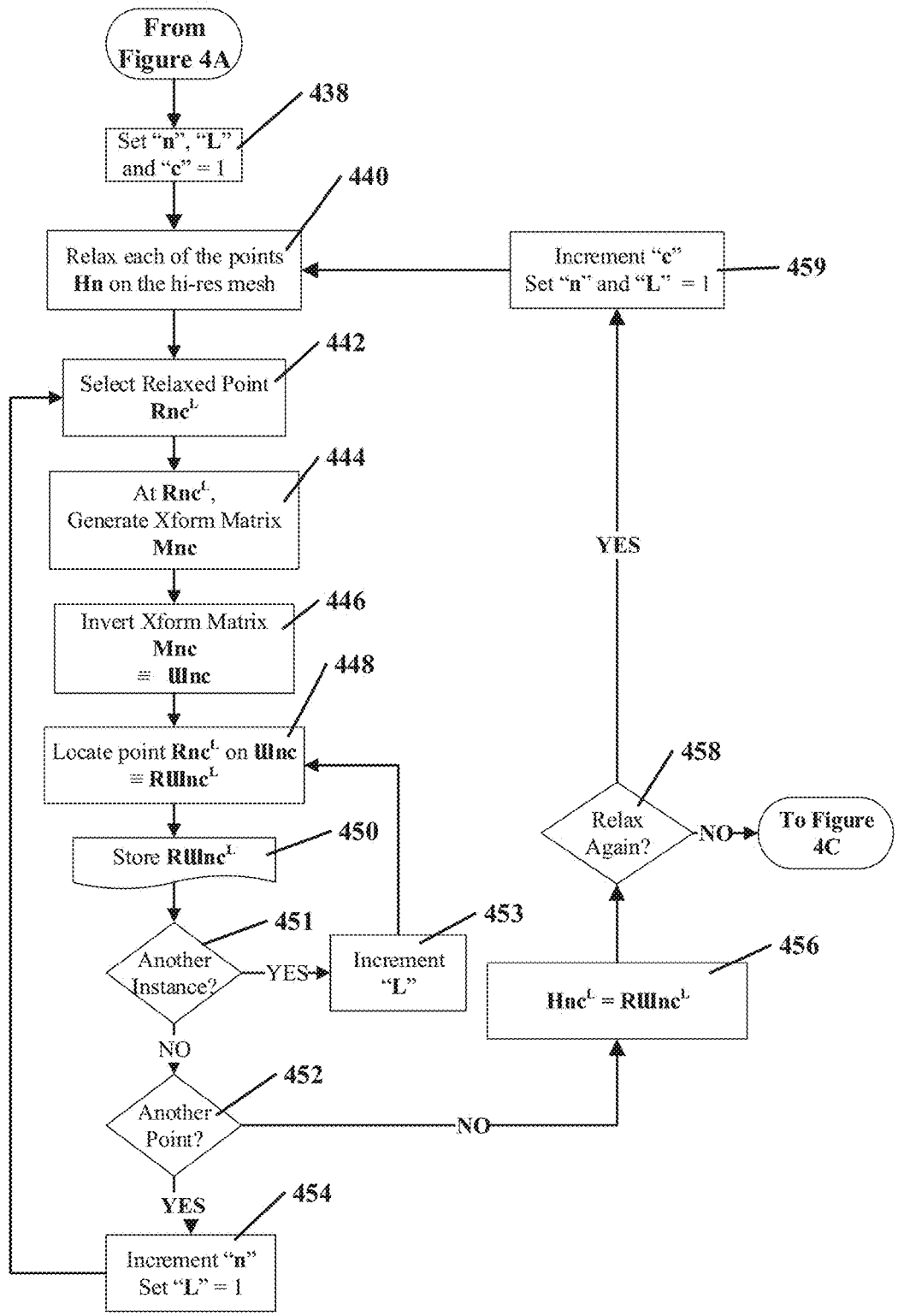

As shown in FIG. 4B, per Operation 438, the variables "n", "L" and "c" are set to "1" (throughout this disclosure each of "n", "L" and "c" are integers having a value ≥1). As discussed below, the variable "L" is utilized to indicate which instance of relaxed point is being mapped and the variable "c" is utilized to indicate which iteration (or cycle) of a relaxation of points operation is implemented.

In Operation 440, each of the points Hn previously copied per each of the "n$^{th}$" iterations of Operation 432 (FIG. 4A) are relaxed. Each such point resulting from a relaxation of a given first hi-res point Hn, as relaxed, is identified herein as $Rnc^L$ (the "First Relaxed Hi-Res Point n, instance L"). A first hi-res point Hn, when relaxed, may result in one or more instances of a first relaxed hi-res points such as point $Rnc^1$, $Rnc^2$ and so forth, with each instance providing an element of a hi-res mesh for the Object, as relaxed, and each corresponding to the first hi-res point Hn prior to Hn being relaxed. It is to be appreciated that an element of a mesh, such as vertex 208-CD on the first hi-res mesh 102 (FIG. 1), can be "relaxed" using computer graphic software applications such as the MAYA™ program and other programs. When "relaxing" a first hi-res point Hn, the mesh, at the selected point to be relaxed, can be progressively smoothed without losing the pre-relaxation size, volume or detail associated with the mesh at the first hi-res point. Each instance of such point as relaxed, $Rnc^L$ can be represented using a point matrix existing in three dimensions on an n$^{th}$ hi-res mesh coordinate system.

In Operation 442, one of the instances of the first relaxed points $Rnc^L$ is selected and a transformation matrix Mnc (the "First Relaxed Transform Matrix n") is generated (Operation 444). As shown in FIG. 4B, the first relaxed transform matrix Mnc is applied to each instance of $Rnc^L$ per at least one embodiment. In other embodiments, separate first relaxed transform matrices may be used for each instance of first relaxed points $Rnc^L$. When separate relaxed transform matrices are to be applied to each instance of a first relaxed point, operations 444 and 446 are executed for such an embodiment. As per Operation 424, the First Relaxed Transform Matrix is used to identify and map the location of $Rnc^L$ on the first hi-res mesh into the coordinate system used to locate point the Pn previously identified as corresponding to the point Hn with respect to the first proxy mesh used for the Object to be deformed. Per this operation and in accordance with at least one embodiment, a mapping of the relaxed Hn point (i.e., a given point $Rnc^i$ as relaxed) is provided using the same transformation matrix generated for point Hn in Operation 424.

In Operation 446, the transformation matrix Mnc is inverted resulting in an inverse transform matrix $\mathcal{U}$ nc (the "$c^{th}$ Relaxed Inverse Transform Matrix n"). The inverse transform matrix $\mathcal{U}$ nc can be used to identify the location of a point $Rnc^L$ on a first proxy mesh relative to the coordinate system utilized for the first hi-res mesh at point Hn.

In Operation 448, $Rnc^L$ is located in the first proxy mesh coordinate system by multiplying the point matrix representing the location of $Rnc^L$ on the first hi-res mesh (using the corresponding hi-res coordinate system) by the $c^{th}$ Relaxed Inverse Transform Matrix $\mathcal{U}$ nc. Mathematically, this operation can be expressed as $Rnc^L \times \mathcal{U} nc = R\mathcal{U} nc^i$ (the "$c^{th}$ Relaxed Hi-Res on First Proxy System n"), where $R\mathcal{U}$ nc is the location of the point $Rnc^L$ using the proxy mesh coordinate system utilized with respect to proxy mesh point Pn.

In Operation 450, $R\mathcal{U} nc^L$ is stored. It is to be appreciated that such storage may be accomplished using local, remote, cloud-based or other storage devices and systems.

In Operations 451, a determination is made as to whether a mapping of another instance of a relaxed point $Rnc^L$ is to be accomplished. If so, "L" is incremented (Operation 453) and Operations 448-450 are accomplished for such next instance of the relaxed point.

In Operation 452, a determination is made as to whether another relaxed point is to be mapped to the proxy mesh coordinate system.

If so, in Operation 454, "n" is incremented and "L" is set to "1". Operations 442-453 are repeated until each point $Rnc^L$ to be mapped is mapped to the proxy mesh coordinate system.

In Operation 456, once each point $Rnc^L$ has been mapped to the proxy mesh coordinate system, each point Hn previously identified in operation 440 is set, as a new variable, or matrices of variables when L>1, $Hnc^L$ to the location of the relaxed version of such point, $R\mathcal{U} nc^L$. This operation can be expressed mathematically as: $Hnc^L = R\mathcal{U} nc^L$.

In Operation 458, a determination is made as to whether a second (or third, or "$c^{th}$") relaxation and mapping of such relaxed points to the first proxy mesh coordinate system is desired.

If so, in Operation 459, the variable "c" is incremented to indicate a second, third or the like iteration/cycle of the relaxing of the hi-res mesh and the parameters "n" and "L" are reset to 1 for the first point and instance on such relaxed hi-res mesh. It is to be appreciated for at least one embodiment that the hi-res mesh relaxed per any $2^{nd}$ or subsequent "$c^{th}$" iteration is the previously relaxed version of the hi-res mesh. For other embodiments, however, a $2^{nd}$ or subsequent iteration of a relaxation of a hi-res mesh may occur with respect to the first hi-res mesh using various settings for various relaxation parameters, such as the maximum Displacement, seam/pole tolerance settings or other settings, or combinations thereof, provided by the MAYA™ program or otherwise. For at least one embodiment, five (5) relaxation cycles are applied to the first hi-res mesh and operations 442-456 are utilized to map each version of such relaxed points according to the coordinate system utilized for the first proxy mesh with respect to the given Object.

Figure 4C:
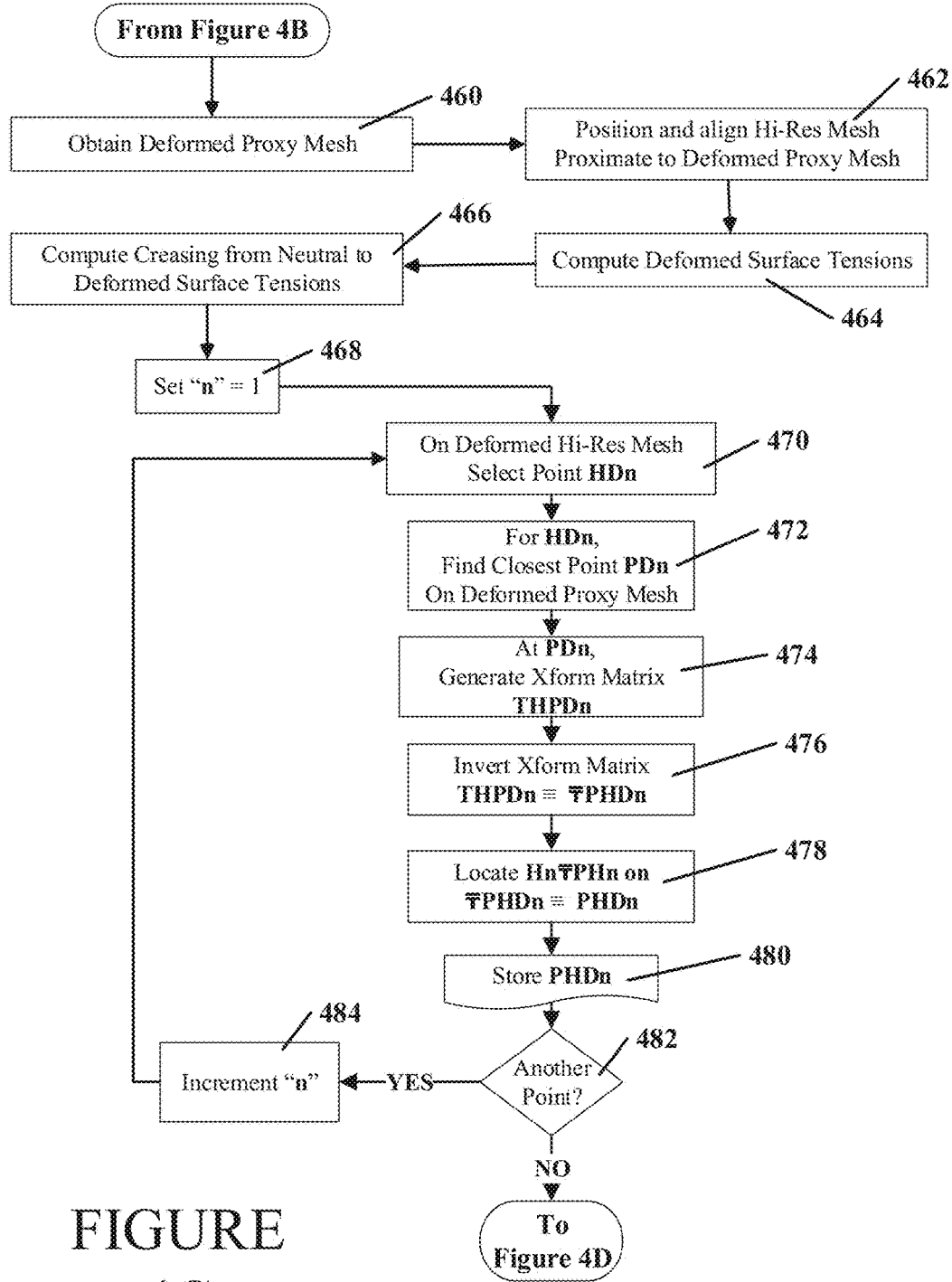

Referring again to Operation 458, once any desired number of relaxation cycles has been completed the process continues with Operation 460 of FIG. 4C.

As shown in FIG. 4C, once the desired number of relaxation cycles and mapping of points has been accomplished, deformation of the Object occurs. For at least one embodiment, the operations of FIG. 4C are applied to each frame over which an Object is deformed from a first state to a final state. It is to be appreciated, however, that the operations of FIG. 4C need not be applied for every frame or to every portion of an Object deformed from a first state to a final state, and the application of the operations of FIG. 4C to one or more portions of an Object or to one or more frames for a given deformation may be determined by an animator, or specified according to one or more predetermined conditions.

As shown in FIG. 4C, per Operation 460 and for at least one embodiment, a second deformed proxy mesh is obtained or generated, as the case may be. The second proxy mesh is desirably deformed to reflect the changes made to the Object from one frame to a next frame. As discussed above, such deformation of the first proxy mesh may arise, for example, by an animator's manual, semi-automatic or automatic manipulation of an animation skeleton corresponding to the first proxy mesh and the first hi-res mesh. Such deformation may also occur by an animator's manipulation of the first proxy mesh itself, without the use of an animation skeleton. For example, as shown in FIG. 3, an animator may deform an animation skeleton by raising an Object's "arms" from an "I" position into a "T" position. Since, for at least one embodiment, the first proxy mesh is bound to the animation skeleton, the raising of the arms via the repositioning of the Humerus and Ulna elements of the animation skeleton, for example, results in a corresponding repositioning of those portions of the proxy mesh effected by the raising of the animation skeleton. Such portions of the proxy mesh as so deformed being identified herein as the "Second/Deformed Proxy Mesh." It is to be appreciated, however, that given the binding of the few points of the first proxy mesh to the even fewer animation skeleton elements, the resulting deformation of the second proxy mesh may result in a crude, unrefined and/or poor resolution Object. Further, at this stage of the process, for at least one embodiment, an unrefined deformation of the Object is commonly obtained. This result is represented by the raising of the animation skeleton and the second proxy mesh (the deformed first proxy mesh) into a "T" configuration, as shown in FIG. 3.

In Operation 462, the deformation of the first hi-res mesh to correspond proximately to the now second/deformed proxy mesh occurs. More specifically, the first hi-res mesh is positioned and aligned in the virtual space containing the Object proximate to the deformed/second proxy mesh resulting in a "Second/Deformed Hi-Res Mesh." Such positioning of the first hi-res mesh proximate to the second/deformed proxy mesh may occur automatically, semi-automatically or manually.

In Operation 464, the surface tensions for the deformed hi-res mesh are calculated. Such calculations may be performed according to one or more of the processes described above with respect to Operation 404 or using any other known process.

In Operation 466, any "creasing" of the hi-res mesh by the deformation is calculated based on the neutral surface tension determinations as determined, for example, per Operation 404, and the deformed surface tension, as determined, for example, per Operation 464. As used herein with respect to at least one embodiment of the present disclosure, a positive "creasing" refers to a compression of a previously determined surface tension, as may occur by the shortening of one or more given edges of a polygon deformed by a given deformation. A negative "creasing" range refers to an extension of a previously determined surface tension, as may occur by the lengthening of one or more edges of a polygon deformed by a given deformation. It is to be appreciated that a single deformation may result in both the compression and extension of a given polygon, with one edge shortening while another edge lengthens. Also, a given deformation may result in the compression of the edges of a first polygon and the lengthening of the edges of a second polygon. For example and as per the bicep curling example discussed above, a compression or positive creasing of a neutral surface tension might arise with respect to one or more of those polygons defining the shape of a bicep region of the torso 100 of FIG. 1 while an extension or negative creasing may also arise with respect to one or more of those polygons defining a tri-cep area of such torso. It is to be appreciated that the defining of a compression as a positive creasing and of an extension as a negative creasing is one of convention only and different naming and definitional schemes may be utilized in accordance with the various embodiments discussed herein. The creasing factor calculated is saved for later use as desired for any given embodiment of the present disclosure.

In Operation 468, the variable "n" is set to "1."

In Operation 470, the point on the second/deformed hi-res mesh, the HDn$^{th}$ point (the "Deformed Hi-Res Point n"), corresponding to then first hi-res point Hn point selected on the first hi-res mesh during Operation 424 (FIG. 4A) is identified.

In Operation 472, a point on the second/deformed proxy mesh (the PDn point or "Deformed Proxy Point n") is selected, where PDn corresponds to the previously found point Pn on the non-deformed proxy mesh.

In Operation 474, a deformed transform matrix THPDn (the "Deformed Transform Matrix n") is generated for each deformed proxy point PDn. The deformed transform matrix is utilized to convert the coordinate system used with respect to the deformed hi-res point HDn on the deformed hi-res mesh into the coordinate system used to locate the deformed proxy point PDn with respect to the deformed proxy mesh. It is to be appreciated that the coordinate system utilized with respect to the deformed meshes (hi-res and proxy) may be the same or different than coordinate systems utilized for the first, non-deformed meshes. When the coordinate systems are the same, it is to be appreciated that the deformed transform matrix is the same as the first transform matrix, that is THPDn=THPn.

In Operation 476, the deformed transform matrix THPDn is inverted resulting in an inverse deformed transform matrix T̄PHDn (the "Inverse Deformed Transform Matrix n"). The inverse deformed transform matrix T̄PHDn can be used to identify the location of the deformed hi-res point HDn on the deformed proxy mesh relative to the coordinate system utilized for the deformed hi-res mesh at the deformed hi-res point HDn.

In Operation 478, the previously determined hi-res point on the first proxy system HnT̄PHn is retrieved from storage and located on the deformed proxy mesh coordinate system by multiplying the point matrix for the hi-res point on the first proxy system HnT̄PHn by the inverse deformed transform matrix T̄PHDn. Mathematically, this operation can be expressed as HnT̄PHn×T̄PHDn=PHDn (the "First Hi-Res Point on First Deformed Proxy System n"). In essence, PHDn is the location of the first hi-res point Hn using the coordinate system utilized with respect to the deformed proxy mesh point PDn. That is, the location of the original hi-res point Hn, as expressed in the first proxy mesh coordinate system, is identified in reference to the deformed proxy mesh coordinate system.

In Operation 480, the point PHDn is stored. It is to be appreciated that such storage may be accomplished using local, remote, cloud-based or other storage devices and systems.

In Operation 482, a determination is made as to whether another point on the deformed hi-res mesh is to be processed and identified as corresponding to a point on the deformed proxy mesh. When an additional point is desired to so be mapped and located, the variable "n" is incremented (Operation 484) and Operations 470-482 are repeated. Otherwise, the process continues on FIG. 4D with Operation 485.

Figure 4D:
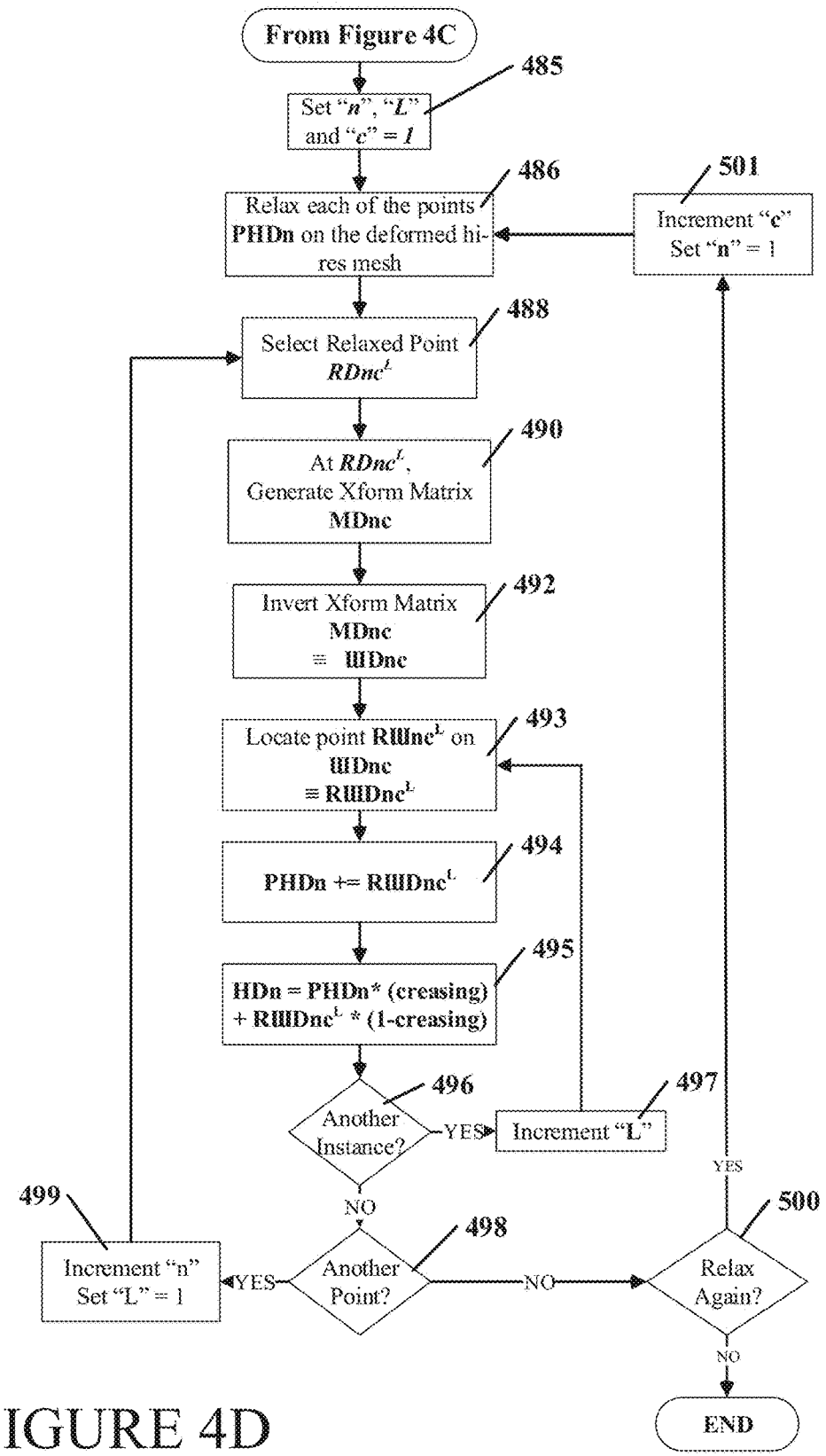

Referring now to FIG. 4D, in Operation 485, the variables "n", "L" and "c" are each set to "1".

In Operation 486, each of the first hi-res points as identified relative to the first deformed proxy system, PHDn are relaxed for the given relaxation cycle "c" of the deformed hi-res mesh. As per Operation 440, each point relaxed may result in one or instances of the relaxed point, with each instance providing an element of a hi-res mesh for the Object as deformed and as relaxed and as corresponding to deformed hi-res point prior to relaxation thereof. These points, as relaxed, are identified herein as RDnc$^L$ and referred to as the "C$^{th}$ Relaxed Deformed Hi-Res Point n."

In Operation 488, one of the relaxed deformed hi-res points RDnc$^L$ is selected.

In Operation 490, a transformation matrix MDnc (the "c$^{th}$ Relaxed Deformed Transform Matrix n") is generated for the selected point. As shown in FIG. 4D, the first relaxed transform matrix MDnc is applied to each instance of RDnc$^L$ per at least one embodiment. In other embodiments, separate first relaxed transform matrices may be used for each instance of RDnc$^L$. When separate relaxed transform matrices are to be applied to each instance of RDnc$^L$, operations 490 and 492 are executed for such an embodiment. This transformation matrix is used to identify and map the location of the relaxed hi-res point RDnc$^L$ on the c$^{th}$ deformed hi-res mesh into the coordinate system previously used to locate the first proxy point, Pn.

In Operation 492, the transformation matrix MDnc is inverted resulting in an inverse transform matrix ω̄Dnc (the "c$^{th}$ Relaxed Inverse Transform Matrix n"). The relaxed inverse transform matrix ω̄Dnc can be used to identify the location of the relaxed hi-res point RDnc$^L$ on a c$^{th}$ proxy mesh relative to the coordinate system utilized to identify the location of the first hi-res point on the first deformed proxy system, PHDn.

In Operation 493, the c$^{th}$ relaxed hi-res point on first proxy system Rω nc$^L$ (which was previously saved per Operation 450 of FIG. 4B) is retrieved and located on the c$^{th}$ deformed proxy mesh coordinate system by multiplying the point matrix representing the location of Rω nc$^L$ by the relaxed inverse transform matrix ω̄Dnc. Mathematically, this operation can be expressed as Rω nc$^L$×ω̄Dnc=Rω Dnc$^L$, where Rω Dnc$^L$ (the c$^{th}$ Relaxed Hi-Res Point on Deformed Proxy System n, instance L) is the location of the point R ω nc$^L$ using the deformed proxy mesh coordinate system utilized with respect to first proxy mesh point Pn (as identified per Operation 422) which closest corresponded to the first hi-res point on the first deformed proxy system PHDn (as determined per Operation 478 and stored per Operation 480).

In Operation 494, the location of the first hi-res point on the first deformed proxy system, PHDn is adjusted by the determined location of the relaxed hi-res point on the deformed proxy system, $R\mathcal{U} Dnc^L$. It is to be further appreciated that any adjustments to the position of point PHDn need not be humanly perceptible to an animator and may be accomplished as a mathematical calculation performed by the processor(s) used for any given computing system. It is further to be appreciated that a significant adjustment of a position of a given point PHDn may require a recalculation or adjustment of other points on a deformed hi-res mesh and multiple iterations of process steps 488-497 may be needed to obtain a desired deformation.

In Operation 495, each deformed hi-res point HDn on the deformed hi-res mesh is adjusted to account for any "creasing" that has occurred. For at least one embodiment of the present disclosure, this adjustment is accomplished by adjusting the position of each deformed hi-res point as follows:

$$HDn = PHDn^*(\text{creasing}) + R\mathcal{U} Dnc^*(1-\text{creasing})$$

Where the "creasing" factor was calculated per Operation 466.

In Operations 496, a determination is made as to whether a mapping of another instance of a relaxed deformed point $RDnc^L$ is to be accomplished.

If so, in Operation 497, "L" is incremented and Operations 493-496 are accomplished for such next instance of the relaxed point.

In Operation 498, a determination is made as to whether another relaxed point is to be mapped to the deformed proxy mesh coordinate system.

If so, in Operation 499, "n" is incremented and "L" is set to "1". Operations 488-496 are repeated until each point $RDnc^L$ to be mapped is mapped to the proxy mesh coordinate system.

In Operation 500, a determination is made as to whether a second (or third, or "$c^{th}$") relaxation and adjustment of the final hi-res deformed points is desired.

If so, in Operation 501, the variable "c" is incremented to indicate a second, third or the like iteration/cycle of the relaxing of the hi-res mesh and the parameters "n" and "L" are reset to 1 for the first point on such relaxed and deformed hi-res mesh. It is to be appreciated for at least one embodiment that the hi-res mesh as deformed is relaxed per any $2^{nd}$ or subsequent "$c^{th}$" iteration to correspond to the relaxations of the first hi-res mesh accomplished per the "c" number of iterations previously performed for Operation 440 (FIG. 4B). In other embodiments, the number of relaxations performed may be adjusted by an animator or adjusted automatically or semi-automatically.

Figure 5:
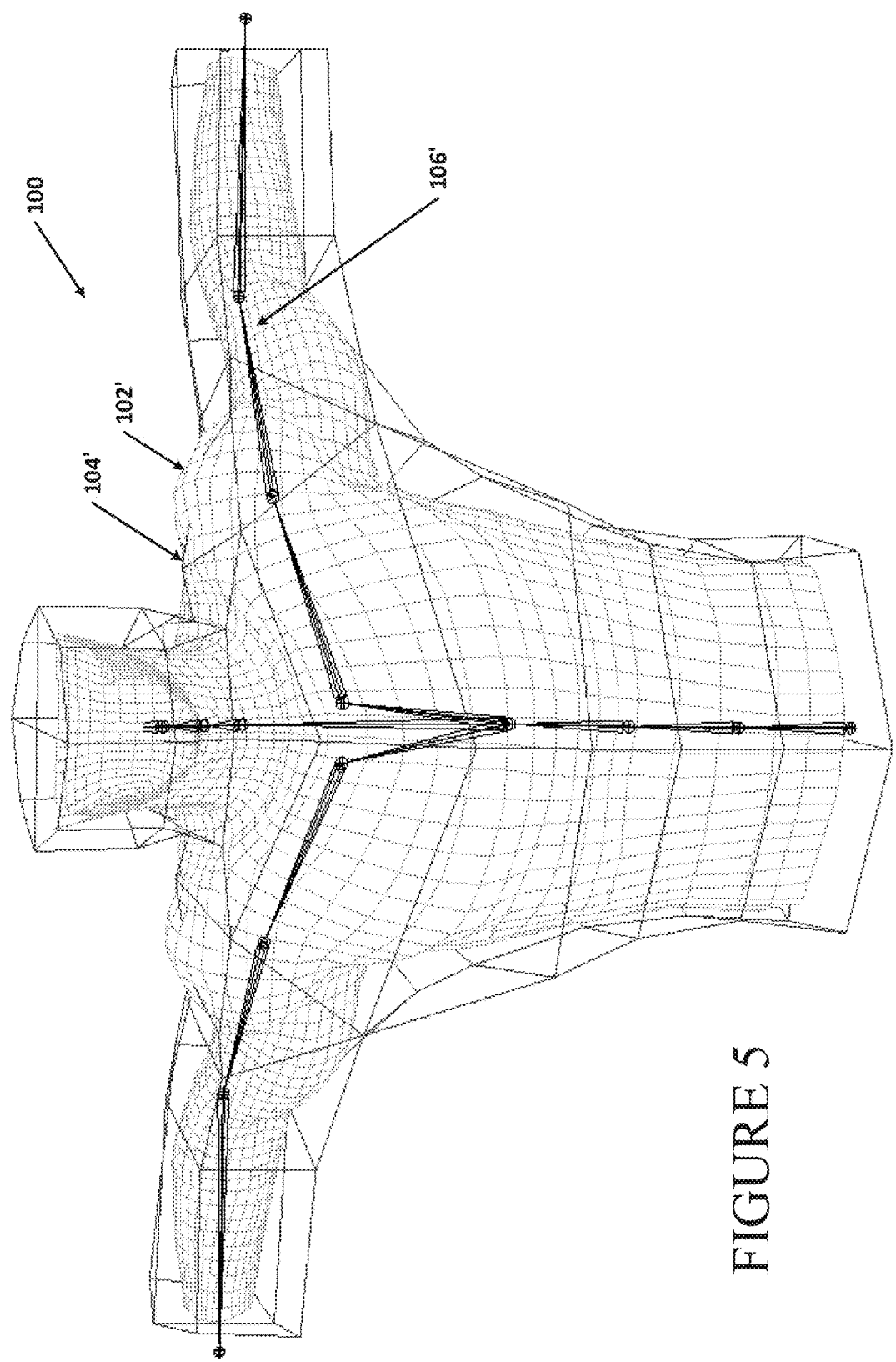
FIG. 5 is a pictorial representation of a deformation of the torso object of FIG. 1 as adjusted in accordance with at least one of the processes of the present disclosure.

FIG. 5 is a representation of a deformation of the torso 100 of FIG. 1 after the Operations of FIG. 4A-4D have been performed in accordance with at least one relaxation of the points. As shown, the hi-res mesh 102' has been deformed to reflect a life-like "T" formation based on the previous deformations of the proxy mesh 104' and animation skeleton 106' (as shown in FIG. 3). It is to be appreciated that the number of relaxation cycles needed for any given implementation of the various embodiments discussed herein may vary by the number of polygons utilized to given a given Object, the type of deformation utilized, or as otherwise desired by an animator. For example, a translation and rotation of an Object may require more relaxations than a mere translation of an Object in a given coordinate plane. Accordingly, the various embodiments are not to be considered as requiring or being limited to any number of relaxation cycles.

Computing System

For at least one embodiment, a computer system for implementing the processes described above may be a computing device as described above. For at least one embodiment, such computing device may include a single-server, clustered server, blade server, or virtual server operating environment, or possibly a personal computer (PC), a mainframe computer, a distributed computer, an Internet appliance, or other computer devices, or combinations thereof, with internal processing and memory components as well as interface components for connection with external input, output, storage, network, and other types of peripheral devices. In any embodiment or component of the system described herein, the computer system includes a processor, such as a processor capable of executing multiple threads at the same time in parallel, and a system memory connected by a system bus that also operatively couples various system components. There may be one or more processors operating in a parallel processing environment (for example, a dual-core, quad-core, or other multi-core processing device). The system bus may be any of several types of bus structures including a memory bus or memory controller, a peripheral bus, a switched fabric, point to point connection, and a local bus using any of a variety of bus architectures. The system memory includes read only memory (ROM) and random access memory (RAM). A basic input/output system, operating system kernel or the like, containing the basic routines that help to transfer information between elements within the computer system, such as during start up, may be stored in ROM or otherwise provided. A cache may be set aside in RAM to provide a high speed memory store for frequently accessed data.

A hard disk drive interface may be connected with the system bus to provide read and write access to a data storage device, e.g., a hard disk drive, for nonvolatile storage of applications, files, and data. Other types of non-volatile memory and/or storage devices may be utilized including but not limited to internal and external solid state storage drives. A number of program modules and other data may be stored on the hard disk including an operating system, one or more application programs, and data files. In an exemplary implementation, the hard disk drive may store code associated with the exemplary processes described herein. Note that the hard disk drive may be either an internal component or an external component of the computer system. In some configurations, there may be both an internal and an external hard disk drive.

The computer system may further include a magnetic disk drive for reading from or writing to a removable magnetic disk, tape, or other magnetic media. The magnetic disk drive may be connected with the system bus via a magnetic drive interface to provide read and write access to the magnetic disk drive initiated by other components or applications within the computer system. The magnetic disk drive and the associated computer readable media may be used to provide nonvolatile storage of computer readable instructions, data structures, program modules, and other data for the computer system The computer system may additionally include an optical disk drive for reading from or writing to a removable optical disk such as a CD ROM or other optical media. The optical disk drive may be connected with the system bus via an optical drive interface to provide read and write access to the optical disk drive initiated by other components or applications within the computer system. The optical disk drive and the associated computer readable optical media may be used to provide nonvolatile storage of computer readable instructions, data structures, program modules, and other data for the computer system.

A display device, e.g., a monitor, a television, or a projector, or other type of presentation device may also be connected, directly or indirectly, to the system bus via an interface, such as a video adapter/interface. Similarly, audio devices, for example, external speakers or a microphone, may be connected directly or indirectly to the system bus through an audio interface.

In addition to the monitor, the computer system may include other peripheral input and output devices, which are often connected to the processor and memory through the serial port interface that is coupled to the system bus. Input and output devices may also or alternately be connected with the system bus by other interfaces, for example, a universal serial bus (USB), an IEEE 1394 interface ("Firewire"), a parallel port, or a game port, and HDMI, Digital Video Interactive (DVI), wirelessly or otherwise. A user may enter commands and information into the computer system through various input devices including, for example, a keyboard and pointing device, for example, a mouse, a touch screen or otherwise. Other input devices may include, for example, a joystick, a game pad, a tablet, a touch screen device, a satellite dish, a scanner, a facsimile machine, a microphone, a digital camera, and a digital video camera.

Output devices may include, for example, a printer, a plotter, a photocopier, a photo printer, a facsimile machine, a press, and other forms of physical media output devices. In some implementations, several of these input and output devices may be combined into single devices, for example, a printer/scanner/fax/photocopier. It should also be appreciated that other types of computer readable media and associated drives for storing data, for example, magnetic cassettes or flash memory drives, may be accessed by the computer system via the serial port interface (e.g., USB) or similar port interface.

The computer system may operate in a networked environment using logical connections through a network interface coupled with the system bus to communicate with one or more remote devices. The logical connections can include but are not limited to a local area network (LAN) and a wide area network (WAN). Such networking environments are commonplace in home networks, office networks, enterprise wide computer networks, and intranets. These logical connections may be achieved by a communication device coupled to or integral with the computer system. The LAN may use a router or hub, wired or wireless, internal or external, to connect with remote devices, e.g., a remote computer similarly connected on the LAN. The remote computer may be another personal computer, a server, a client, a peer device, or other common network node, and typically includes many or all of the elements described above relative to the computer system.

To connect with a WAN, the computer system typically includes a modem for establishing communications over the WAN. Typically the WAN may be the Internet. However, in some instances the WAN may be a large private network spread among multiple locations, or a virtual private network (VPN). The modem may be a telephone modem, a high speed modem (e.g., a digital subscriber line (DSL) modem), a cable modem, or similar type of communications device.

The modem, which may be internal or external, is connected to the system bus via the network interface. In alternate embodiments the modem may be connected via the serial port interface. It should be appreciated that the foregoing network connections are exemplary and other means of and communications devices for establishing a network communications link between the computer system and other devices or networks may be used.

The technology described herein may be implemented as logical operations and/or modules in one or more systems. The logical operations may be implemented as a sequence of processor-implemented steps executing in one or more computer systems and as interconnected machine or circuit modules within one or more computer systems. Likewise, the descriptions of various component modules may be provided in terms of operations executed or effected by the modules. The resulting implementation is a matter of choice, dependent on the performance requirements of the underlying system implementing the described technology. Accordingly, the logical operations making up the embodiments of the technology described herein are referred to variously as operations, steps, objects, or modules. Furthermore, it should be understood that logical operations may be performed in any order, unless explicitly claimed otherwise or a specific order is inherently necessitated by the claim language.

In some implementations, articles of manufacture are provided as computer program products that cause the instantiation of operations on a computer system to implement the invention. One implementation of a computer program product provides a non-transitory computer program storage medium readable by a computer system and encoding a computer program. It should further be understood that the described technology may be employed in special purpose devices independent of a personal computer.

The above specification, examples and data provide a description of the structure and use of exemplary embodiments of the invention as defined in the claims. Although various embodiments of the claimed invention have been described above with a certain degree of particularity, or with reference to one or more individual embodiments, those skilled in the art could make numerous alterations to the disclosed embodiments without departing from the spirit or scope of the claimed invention. Other embodiments are therefore contemplated. It is intended that all matter contained in the above description and shown in the accompanying drawings shall be interpreted as illustrative only of particular embodiments and not limiting. Changes in detail or structure may be made without departing from the basic elements of the invention as defined in the following claims.

The invention claimed is:

1. A method for deforming a virtual geometric object providing underlying structure of a three-dimensional computer animation object to generate a substantially real-time visualization of animation of the virtual geometric object, the method comprising using a computing device with a processor to execute the following steps:
   obtaining within a memory accessible by the processor a high-resolution mesh comprising a plurality of high resolution mesh elements defining a detailed shape of the virtual geometric object providing the underlying structure of the three-dimensional computer animation object which is bound to the high resolution mesh;
   obtaining within the memory a proxy mesh comprising a plurality of proxy mesh elements defining a lower resolution, abstracted shape of the virtual geometric object wherein the proxy mesh elements are fewer in number than the high-resolution mesh elements;

for each of the first high-resolution mesh elements, identifying a corresponding one of the proxy mesh elements relative to each of the respective high-resolution mesh elements;

determining locations of each high-resolution mesh element within a proxy mesh coordinate system defined relative to the proxy mesh;

relaxing the high-resolution mesh elements to smooth the high-resolution mesh, thereby creating one or more instances for each relaxed high-resolution mesh element;

determining locations of one or more of the instances for each of the relaxed high-resolution mesh elements within the proxy mesh coordinate system;

deforming the proxy mesh to obtain a deformed proxy mesh of the virtual geometric object, wherein the deformed proxy mesh includes a plurality of deformed proxy mesh elements reflecting a re-positioning of each of the proxy mesh elements;

deforming the high-resolution mesh by repositioning each high-resolution mesh element proximate to its corresponding proxy mesh element, now repositioned as deformed proxy mesh elements;

transforming the previously determined locations of the high-resolution mesh elements in the proxy mesh coordinate system into first deformed locations within a deformed proxy mesh coordinate system defined relative to the deformed proxy mesh;

relaxing the high-resolution mesh elements at the first deformed locations within the deformed proxy mesh coordinate system, thereby creating one or more instances for each relaxed high-resolution mesh element defined with respect to the first deformed locations in the deformed proxy mesh coordinate system;

transforming the previously determined locations of the relaxed high-resolution mesh element instances from the proxy mesh coordinate system into second deformed locations within the deformed proxy mesh coordinate system;

adjusting the first deformed locations of the high-resolution mesh elements within the deformed proxy mesh coordinate system by the second deformed locations of the relaxed high-resolution mesh element instances within the deformed proxy mesh coordinate system, which thereby moves the three-dimensional animation object bound to the high resolution mesh; and rendering a high resolution animation of the three-dimensional animation object bound to the virtual geometric object as deformed using the adjusted first deformed locations of the high-resolution elements within the deformed proxy mesh coordinate system for visualization on a display device.

2. The method of claim 1, wherein
the high-resolution mesh defines a shape of the virtual geometric object by utilizing a plurality of polygons, each polygon having at least three edges; and
the method further comprises determining at least one neutral surface tension for the virtual geometric object based upon a measured length of at least one of the at least three edges of the polygons.

3. The method of claim 1, wherein
the high-resolution mesh includes at least one vertex defined in terms of at least one vector; and
the method further comprises determining at least one neutral surface tension for the virtual geometric object based on a magnitude of the at least one vector.

4. The method of claim 2, wherein the high-resolution mesh elements comprise an edge of a polygon, wherein the high-resolution mesh defines a shape of object using two or more polygons.

5. The method of claim 3, wherein the high-resolution mesh elements comprise a vertices on the high-resolution mesh.

6. The method of claim 1, comprising:
identifying on the proxy mesh a plurality of sets of at least three vertices each defining a polygon defining a shape of the object, wherein the vertices designate the proxy mesh elements; and
identifying connectivities between the vertices of each polygon.

7. The method of claim 1 further comprising obtaining within a memory accessible by the processor an animation skeleton.

8. The method of claim 7, further comprising binding the proxy mesh to the animation skeleton.

9. The method of claim 1, wherein the high-resolution mesh elements each include a high-resolution mesh vertex and a location of the high-resolution mesh vertex is defined in a virtual space relative to a high-resolution mesh coordinate system.

10. The method of claim 9, wherein
the proxy mesh elements each include a proxy mesh vertex; and
the method further comprises selecting the proxy mesh vertex closest in the virtual space to one or more of the high-resolution mesh vertices.

11. The method of claim 10, wherein locations of the proxy mesh vertices are defined in the virtual space relative to the proxy mesh coordinate system.

12. The method of claim 11, wherein the operation of determining locations of each high-resolution mesh element within a proxy mesh coordinate system comprises generating a transform matrix for converting the locations of the high-resolution mesh vertices from the high-resolution mesh coordinate system into the proxy mesh coordinate system.

13. The method of claim 12 comprising inverting the transform matrix to generate an inverse transform matrix, wherein the inverse transform matrix facilitates identifying a locations of the high-resolution mesh vertices on the proxy mesh relative to the high-resolution mesh coordinate system.

14. The method of claim 13, comprising multiplying the location of the high-resolution mesh vertex by the first inverse transform matrix.

15. The method of claim 13, wherein the high-resolution mesh includes a second through $n^{th}$ high-resolution mesh element and the method comprises determining for at least one of the second through $n^{th}$ high-resolution mesh elements an $n^{th}$ high-resolution mesh element proxy system location.

16. The method of claim 15, comprising determining the $n^{th}$ high-resolution mesh element proxy system locations for each of the $n^{th}$ high-resolution mesh elements.

17. The method of claim 1, wherein the each high-resolution mesh element comprises a portion of a polygon used to define the virtual geometric object and wherein the operation of relaxing the high-resolution mesh elements results in the high-resolution mesh being smoothed while maintaining at least one of a pre-relaxation size, a volume, or detail characteristic associated with the polygon.

18. The method of claim 1, wherein each relaxed high-resolution mesh element includes a relaxed high-resolution mesh vertex and a location of the relaxed high-resolution mesh vertex is defined in a virtual space relative to a third coordinate system.

19. The method of claim 18, wherein the operation of determining locations of one or more instances for each of the relaxed high-resolution mesh elements within the proxy mesh coordinate system comprises
generating a relaxed transform matrix for converting the location of the relaxed high-resolution mesh elements from the third coordinate system into the proxy mesh coordinate system;
inverting the relaxed transform matrix to generate a relaxed inverse transform matrix, wherein the relaxed inverse transform matrix facilitates identifying locations of the relaxed high-resolution mesh vertices on the proxy mesh relative to the high resolution mesh coordinate system; and
multiplying the locations of relaxed high-resolution mesh vertices by the first relaxed inverse transform matrix.

20. The method of claim 19, wherein the relaxing of the high-resolution mesh element results in at least two instances of relaxed high-resolution mesh elements and the locations are determined for each instance of the relaxed high-resolution mesh element.

21. The method of claim 20, wherein the high-resolution mesh includes a second through $n^{th}$ high-resolution mesh element and the method comprises relaxing at least one of the $n^{th}$ high-resolution mesh elements, resulting in at least one $n^{th}$ relaxed high-resolution mesh element instance, and determining for each of the $n^{th}$ relaxed high-resolution mesh element instances a location of the selected $n^{th}$ relaxed high-resolution mesh element instance on the proxy mesh coordinate system.

22. The method of claim 1, wherein
an element of an animation skeleton is bound to one or more proxy mesh elements; and
the method further comprises adjusting the element of the animation skeleton from a first state to a second state resulting in a corresponding adjustment of the proxy mesh elements.

23. The method of claim 22, wherein the first state is at least one of a first position and a first orientation in a virtual space and the second state is at least one of a second position and a second orientation in the virtual space.

24. The method of claim 23, wherein a change of at least one of the position and orientation of the animation skeleton from the first state to the second state changes at least one of the position and orientation of the first proxy mesh elements.

25. The method of claim 24, wherein at least one of the location and the orientation of the element of the animation skeleton is defined according to a fourth coordinate system.

26. The method of claim 1, wherein the high-resolution mesh element locations in the proxy mesh coordinate system are the locations of the high-resolution mesh elements in a coordinate system used to identify the locations of the proxy mesh elements in a given virtual space prior to a deformation of the object.

27. The method of claim 1, wherein the high-resolution mesh is deformed by an animator manually adjusting a location of the high-resolution mesh elements to be proximate to locations of the deformed proxy mesh elements.

28. The method of claim 1, wherein the high-resolution mesh is deformed automatically with a deformation of an animation skeleton corresponding to the proxy mesh.

29. The method of claim 1, wherein
the high-resolution mesh defines a shape of the virtual geometric object by utilizing two or more polygons, each polygon having at least three edges, and
based on a length of at least one of the at least three edges for at least one of the two or more polygons the method further comprises
prior to deformation of the high-resolution mesh, determining at least one neutral surface tension for the object; and
after deformation of the high-resolution mesh, determining at least one deformed surface tension for the object.

30. The method of claim 29, comprising determining a creasing factor by comparing the at least one neutral surface tension determined prior to deformation of the high-resolution mesh with the at least one surface tension determined after deformation of the high-resolution mesh.

31. The method of claim 1, wherein
each of the high-resolution mesh elements and the deformed high-resolution mesh elements includes at least one vertex, and
the method further comprises selecting the at least one vertex in the deformed high-resolution mesh elements closest in a virtual space to corresponding vertices in the first high-resolution mesh.

32. The method of claim 1, wherein
each deformed proxy mesh element includes at least one deformed proxy mesh vertex and each proxy mesh element selected pre-deformation of the proxy mesh includes at least one proxy mesh vertex, and
the method further comprises selecting the deformed proxy mesh vertices closest in a virtual space to the selected proxy mesh vertices.

33. The method of claim 32, wherein a single coordinate system is used to define the locations of each of the deformed proxy mesh vertices and the proxy mesh vertices in the virtual space.

34. The method of claim 32, comprising:
generating an inverse deformed transform matrix; and
multiplying the high-resolution mesh element locations in the proxy mesh coordinate system by the inverse deformed transform matrix.

35. The method of claim 1, wherein the locations of the selected relaxed deformed high-resolution mesh element instances on the proxy mesh coordinate system are determined using a relaxed inverse transform matrix.

36. The method of claim 35, wherein the locations of the relaxed deformed high-resolution mesh element instances on the proxy mesh coordinate system are determined by multiplying a relaxed high-resolution mesh element location specified in a virtual space according to a coordinate system utilized for the proxy mesh by the relaxed inverse transform matrix.

37. The method of claim 1, comprising determining if any creasing has occurred from the deformation of the high-resolution mesh and, if deformation has occurred, adjusting the locations the first high-resolution mesh elements based on the determined creasing.

38. The method of claim 1, wherein determining the locations of each high-resolution mesh element within the proxy coordinate system comprises
defining a high resolution coordinate system relative to the high resolution mesh;
creating a first coordinate system transformation between the high resolution coordinate system and the proxy coordinate system based upon a relationship between the high resolution mesh elements and the corresponding proxy mesh elements.

39. The method of claim 38, wherein the first coordinate system transformation comprises
creating a first transform matrix to transform from the high resolution coordinate system to the proxy coordinate system; and
creating an inverse of the first transform matrix to identify locations of the high resolution mesh elements within the proxy coordinate system.

40. The method of claim 1, wherein determining the locations of the instances of the relaxed high-resolution mesh elements within the proxy mesh coordinate system comprises
defining a high resolution coordinate system relative to the high resolution mesh;
creating a relaxed coordinate system transformation between the high resolution coordinate system and the proxy coordinate system based upon a relationship between the instances of the relaxed high resolution mesh elements and the corresponding proxy mesh elements.

41. The method of claim 40, wherein the relaxed coordinate system transformation comprises
creating a relaxed transform matrix to transform from the high resolution coordinate system to the proxy coordinate system; and
creating an inverse of the relaxed transform matrix to identify locations of the instances of the high resolution mesh elements within the proxy coordinate system.

42. The method of claim 41, wherein the relaxed transform matrix is identical to the first transform matrix and the inverse relaxed transform matrix is identical to the inverse of the first transform matrix.

43. The method of claim 1, wherein transforming the previously determined locations of the high-resolution mesh elements in the proxy coordinate system into first deformed locations within the deformed proxy coordinate system further comprises
defining a deformed high resolution coordinate system defined relative to the deformed high resolution mesh;
creating a deformed coordinate system transformation between the deformed high resolution coordinate system and the deformed proxy coordinate system based upon a relationship between the deformed high resolution mesh elements and the corresponding deformed proxy mesh elements.

44. The method of claim 43, wherein the deformed coordinate system transformation comprises
creating a deformed transform matrix to transform from the deformed high resolution coordinate system to the deformed proxy coordinate system; and
creating an inverse of the deformed transform matrix to identify locations of the deformed high resolution mesh elements within the deformed proxy coordinate system.

45. The method of claim 1, wherein transforming the previously determined locations of the relaxed high-resolution mesh element instances in the proxy coordinate system into second deformed locations within the deformed proxy coordinate system further comprises
defining a deformed high resolution coordinate system defined relative to the deformed high resolution mesh;
creating a relaxed deformed coordinate system transformation between the deformed high resolution coordinate system and the proxy coordinate system based upon a relationship between the relaxed deformed high resolution mesh elements and corresponding proxy mesh elements.

46. The method of claim 45, wherein the relaxed deformed coordinate system transformation comprises
creating a relaxed deformed transform matrix to transform from the relaxed deformed high resolution coordinate system to the proxy coordinate system; and
creating an inverse of the relaxed deformed transform matrix to identify the second deformed locations of the relaxed high resolution mesh element instances within the deformed proxy coordinate system.

* * * * *